(12) United States Patent
Crosby et al.

(10) Patent No.: US 12,508,860 B2
(45) Date of Patent: Dec. 30, 2025

(54) SPINDLE FOR A RECREATIONAL VEHICLE

(71) Applicant: Arctic Cat Inc., Thief River Falls, MN (US)

(72) Inventors: Jacob Tyler Crosby, Oklee, MN (US); Nathan Lee Blomker, Thief River Falls, MN (US)

(73) Assignee: Arctic Cat Inc., Thief River Falls, MN (US)

(*) Notice: Subject to any disclaimer, the term of this patent is extended or adjusted under 35 U.S.C. 154(b) by 0 days.

(21) Appl. No.: 18/955,842

(22) Filed: Nov. 21, 2024

(65) Prior Publication Data

US 2025/0083486 A1 Mar. 13, 2025

Related U.S. Application Data

(63) Continuation of application No. 17/988,304, filed on Nov. 16, 2022, now Pat. No. 12,179,545.

(60) Provisional application No. 63/404,841, filed on Sep. 8, 2022, provisional application No. 63/310,276, filed on Feb. 15, 2022.

(51) Int. Cl.
   *B60G 7/00* (2006.01)
   *B60G 7/02* (2006.01)

(52) U.S. Cl.
   CPC .......... *B60G 7/001* (2013.01); *B60G 7/008* (2013.01); *B60G 7/02* (2013.01)

(58) Field of Classification Search
   CPC .......... B60G 7/001; B60G 7/008; B60G 7/02; B62D 17/00; B62M 27/02
   See application file for complete search history.

(56) References Cited

U.S. PATENT DOCUMENTS

| | | |
|---|---|---|
| 2,863,952 A | 12/1958 | John et al. |
| 3,963,083 A | 6/1976 | Reese |
| 5,322,317 A | 6/1994 | Kusaka et al. |
| 5,829,768 A | 11/1998 | Kaneko et al. |
| 6,561,302 B2 | 5/2003 | Karpik |
| 6,860,352 B2 | 3/2005 | Mallette et al. |

(Continued)

FOREIGN PATENT DOCUMENTS

| | | |
|---|---|---|
| CA | 2456088 C | 3/2005 |
| CA | 2411964 C | 7/2005 |

(Continued)

OTHER PUBLICATIONS

"2024 Artic Cat ZR 600 R-XC", 2024 Artic Cat ZR 600 R-XC, Jan. 27, 2023, Youtube [online], [Site Visit Jul. 10, 2023], URL: https://www.youtube.com/watch?v=SGtXchHoDA0&t=4s (Year: 2023), Jan. 27, 2023.

(Continued)

*Primary Examiner* — Jason D Shanske
*Assistant Examiner* — Matthew James O'Neill
(74) *Attorney, Agent, or Firm* — Billion & Armitage

(57) ABSTRACT

Embodiments of the present disclosure describe a recreational vehicle spindle for use with a snowmobile, a snow bike, all-terrain vehicle (ATV), or a side by side vehicle (SxS or UTV). The spindle includes a body with one or more mounts for securing a suspension component and a ground engaging member thereto. The body of the spindle may include one or more of a window, a recess, a leading edge, a triangular cross-sectional shape, an integrated steering stop, and an outboard side that includes a flat surface.

19 Claims, 37 Drawing Sheets

(56) References Cited

U.S. PATENT DOCUMENTS

| | | | |
|---|---|---|---|
| 6,942,050 B1 * | 9/2005 | Honkala | B62M 27/02 |
| | | | 280/21.1 |
| 6,955,237 B1 | 10/2005 | Przekwas et al. | |
| 6,976,550 B2 | 12/2005 | Vaisanen | |
| 7,198,126 B2 | 4/2007 | Vaisanen | |
| 7,249,647 B2 | 7/2007 | Nietlispach | |
| D553,060 S | 10/2007 | Caiazzo | |
| 7,410,182 B1 | 8/2008 | Giese | |
| 8,037,961 B2 | 10/2011 | Fecteau | |
| 8,657,054 B2 | 2/2014 | Mallette et al. | |
| 8,733,773 B2 | 5/2014 | Sampson | |
| 8,919,477 B2 | 12/2014 | Conn et al. | |
| 8,944,204 B2 | 2/2015 | Ripley et al. | |
| 9,090,313 B2 | 7/2015 | Bedard | |
| 9,096,289 B2 | 8/2015 | Hedlund et al. | |
| 9,139,255 B1 | 9/2015 | Glissmeyer et al. | |
| 9,352,802 B2 | 5/2016 | Sampson | |
| 9,428,232 B2 | 8/2016 | Ripley et al. | |
| 9,610,986 B2 | 4/2017 | Conn | |
| D785,513 S | 5/2017 | Park et al. | |
| 9,751,552 B2 | 9/2017 | Mangum et al. | |
| 9,796,437 B2 | 10/2017 | Wilson et al. | |
| 9,873,485 B2 | 1/2018 | Mangum et al. | |
| 9,988,067 B1 | 6/2018 | Mangum et al. | |
| D821,931 S | 7/2018 | Winter et al. | |
| 10,202,169 B2 | 2/2019 | Mangum et al. | |
| 10,232,910 B2 | 3/2019 | Mangum et al. | |
| D845,842 S | 4/2019 | Sun | |
| D864,798 S | 10/2019 | Sun | |
| D865,079 S | 10/2019 | Ewing | |
| 10,435,059 B2 * | 10/2019 | Mallette | B62B 17/02 |
| 10,538,262 B2 | 1/2020 | Mangum et al. | |
| 10,549,817 B2 | 2/2020 | Bernier | |
| 10,647,384 B2 | 5/2020 | Mgen et al. | |
| D887,310 S | 6/2020 | Mcginley et al. | |
| 10,773,774 B2 | 9/2020 | Mangum et al. | |
| 10,899,415 B2 | 1/2021 | Mangum et al. | |
| 10,960,914 B2 | 3/2021 | Mangum et al. | |
| 11,021,187 B2 | 6/2021 | Johnson et al. | |
| 11,027,794 B2 | 6/2021 | Vigen | |
| D947,957 S | 4/2022 | Ewing et al. | |
| D951,149 S | 5/2022 | Ewing | |
| D960,255 S | 8/2022 | Ewing et al. | |
| 11,505,263 B2 | 11/2022 | Hedlund et al. | |
| 2005/0200094 A1 | 9/2005 | Hozumi | |
| 2005/0200096 A1 | 9/2005 | Izquierdo et al. | |
| 2011/0115180 A1 * | 5/2011 | Polakowski | B62M 27/02 |
| | | | 280/124.164 |
| 2013/0175106 A1 | 7/2013 | Bédard et al. | |
| 2013/0206494 A1 | 8/2013 | Hedlund et al. | |
| 2014/0361507 A1 | 12/2014 | Park et al. | |
| 2015/0197313 A1 | 7/2015 | Mstad et al. | |
| 2015/0360722 A1 | 12/2015 | Butlin et al. | |
| 2016/0159392 A1 | 6/2016 | Hoffmann | |
| 2017/0050485 A1 | 2/2017 | Eleazar | |
| 2017/0129526 A1 | 5/2017 | Mangum et al. | |
| 2017/0274932 A1 | 9/2017 | Byrnes | |
| 2018/0086377 A1 | 3/2018 | Kleemann et al. | |
| 2018/0111435 A1 | 4/2018 | Bosch et al. | |
| 2019/0256170 A1 | 8/2019 | Labbe | |
| 2020/0324599 A1 | 10/2020 | Frenzel et al. | |
| 2021/0053652 A1 | 2/2021 | Fuchs et al. | |
| 2021/0053653 A1 | 2/2021 | Mangum et al. | |
| 2021/0129943 A1 | 5/2021 | Mangum et al. | |
| 2021/0206225 A1 | 7/2021 | Casali | |
| 2021/0229731 A1 * | 7/2021 | Stoxen | B62B 17/02 |
| 2021/0245837 A1 | 8/2021 | Vigen | |
| 2023/0049333 A1 | 2/2023 | Prusak et al. | |
| 2023/0052282 A1 | 2/2023 | Hedlund et al. | |
| 2023/0256784 A1 | 8/2023 | Crosby et al. | |

FOREIGN PATENT DOCUMENTS

| | | | |
|---|---|---|---|
| CA | 2371477 C | 7/2006 | |
| CA | 2363856 C | 1/2008 | |
| CA | 2560240 A1 * | 3/2008 | B62M 27/02 |
| CA | 2639857 A1 | 6/2009 | |
| CA | 2877554 A1 | 1/2014 | |
| CA | 2987534 A1 | 12/2016 | |
| CA | 2925800 A1 | 10/2017 | |
| CA | 2925822 A1 | 10/2017 | |
| CA | 3117886 A1 | 5/2020 | |
| CA | 3030691 C | 10/2020 | |
| CA | 3103308 A1 | 6/2021 | |
| CN | 105422273 A | 3/2016 | |
| JP | S55125312 A | 9/1980 | |
| JP | H10217921 A | 8/1998 | |
| JP | 2005193788 A | 7/2005 | |
| JP | 4840406 B2 | 10/2011 | |
| WO | 8607423 A1 | 12/1986 | |
| WO | 2009114414 A1 | 9/2009 | |

OTHER PUBLICATIONS

"Arctic Cat Catalyst Design Spindle and Shocks", https://sleddermag.com/arctic-cat-catalyst-design-insight-engineering/arctic-cat-catalyst-design-spindle-and-shocks/ (Year: 2022), Dec. 12, 2022.

"Arctic Cat Highmark Spindles", https://www.backwoodsbmp.com/product-page/arctic-cat-highmark-spindles-pre-order (Year: 2023), Sep. 19, 2023.

"Arctic Cat LH Spindle-DYN GRY-FABR", Country Cat—https://www.countrycat.com/arctic-cat-4703-113-spindle-lh-dyn-gry-fabr?utm_source=google&utm_medium=cpc&utm_campaign=google-simple&gclid=EAlaIQobChMIuZy_-57GgAMViqNaBR2YIAIVEAQYBSABEgKFZfD_BwE.

"Arctic Cat LH Spindle-DYN GRY-FABR", Retrieved from: https://www.countrycat.com/arctic-cat-4703-113-spindle-lh-dyn-gry-fabr?utm_source=google&utm_medium=cpc&utm_campaign=google-simple&gclid=EAlaIQobChMIuZy_-57GgAMViqNaBR2YIAIVEAQYBSABEgKFZfD_BWE, Aug. 7, 23.

"Arctic Cat RH Spindle-Med GRN-FABR", https://www.countrycat.com/arctic-cat-3703-706-spindle-rh-med-grn-fabr?utm_source=google&utm_medium=cpc&utm_campaign=google-simple&gclid=EAlaIQobChMIuZy_-57GgAMViqNaBR2YIAIVEAQYCyABEglUgPD_BWE.

"Arctic Cat RH Spindle-Med GRN-FABR", https://www.countrycat.com/arctic-cat-3703-724-spindle-rh-med-grn-fabr?utm_source=google&utm_medium=cpc&utm_campaign=google-simple&gclid=EAlaIQobChMIuZy_-57GgAMViqNaBR2YIAIVEAQYAyABEgLlufD_BwE.

"Arctic Cat RH Spindle-Med GRN-FABR", Retrieved from: https://www.countrycat.com/arctic-cat-3703-724-spindle-rh-med-grn-fabr?utm_source=google&utm_medium=cpc&utm_campaign=google-simple&gclid=EAlaIQobChMIuZy_-57GgAMViqNaBR2YIAIVEAQYAyABEgLlufD_BwE.

"Arctic Cat, Snowmobile, 2020, 2020 M 8000 Mountain Cat Alpha One ES 165 Silver, Ski and Spindle Assembly [108122]", www.countrycat.com/arctic-cat-parts?gclid=EAlaIQobChMI7O-P-JzGgAMVdqtaBR1Dbg33EAAYASABEgKGPvD_BwE#/Arctic_Cat/2020_M_8000_MOUNTAIN_CAT_ALPHA_ONE_ES_165_SILVER_INTERNATIONAL_NE_%5bS2020M8HA1NES%5d/SKI_AND_SPINDLE_ASSEMBLY_%5b108122%5d/S2020M8HA1NES/108122/y.

"Artic Cat Snowmobile", Artic Cat Snowmobile, Dec. 7, 2022, SnowGoer Webpage [online], [Site Visit Jul. 10, 2023], URL: https://snowgoer.com/snowmobiles/arctic-cat-releases-more-catalyst-snowmobile-details/31174/ (Year: 2022).

"Artic Cat ZR 600 R-XC", Artic Cat Webpage [online], [Site Visit Jul. 10, 2023], URL: https://arcticcat.txtsv.com/snowmobile/trail-utility/zr-rxc (Year: 2023.

"Deep Snow Lightweight Ski Spindle Kit", https://ski-doo-shop.brp.com/US/en/860201976-deep-snow-lightweight-ski-spindle-kit.html.

(56) References Cited

OTHER PUBLICATIONS

"Front Suspension Kit—(36")", https://ski-doo-shop.brp.com/us/en/860201153-front-suspension-kit-36.html.

"Inside Look_2024 Arctic Cat Snowmobiles (Catalyst) Suspensions", https://www.arcticinsider.com/inside-look-2024-arctic-cat-snowmobiles-catalyst-suspensions/ (Year: 2023), Mar. 1, 2023.

"Ski and Spindle Assembly [108049], Arctic Cat, 2020, 2020 ZR 8000 Sno Pro ES 137 Green [S2020ZXHSPUSG]", retrieved from Ski and Spindle Assembly [108049], Arctic Cat, 2020, 2020 ZR 8000 Sno Pro ES 137 Green [S2020ZXHSPUSG].

"SKI-DOO Deep Snow Lightweight Ski Spindle Kit", Retrieved from: https://ski-doo-shop.brp.com/us/en/860201976- deep-snow-lightweight-ski-spindle-kit.html.

"SKI-DOO Front Suspension Kit", Retrieved from: https://ski-doo-shop.brp.com/us/en/860201153-front-suspension-kit-36.html.

"Snowmobile", 2020 M 8000 Mountain Cat Alpha One ES 165 Silver International NE [S2020M8HA1NES], Ski and Spindle Assembly.

"Snowmobile", 2020 ZR 8000 Sno Pro ES 137 Green [S2020ZXHSPUSG] Ski and Spindle Assembly [108049], https://www.countrycat.com/arctic-cat-parts#/Arctic_Cat/2020_ZR_8000_SNO_PRO_ES_137_GREEN_%5bS2020ZXHSPUSG%5d/SKI_AND_SPINDLE_ASSEMBLY_%5b108049%5d/S2020ZXHSPUSG/108049/y.

* cited by examiner

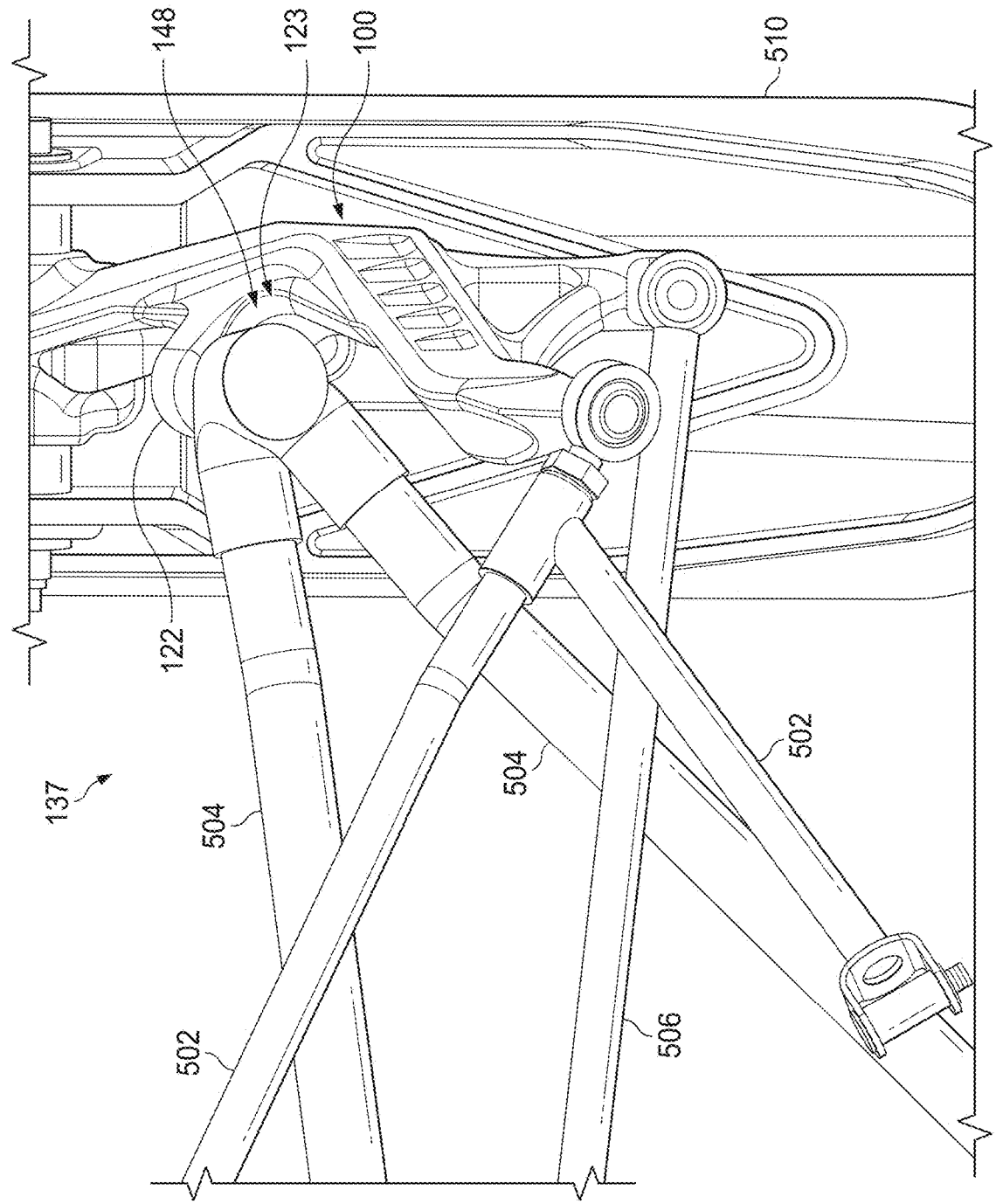

SPINDLE FOR A RECREATIONAL VEHICLE

CROSS REFERENCE TO RELATED APPLICATIONS

This application is a continuation of U.S. application Ser. No. 17/988,304, filed on Nov. 16, 2022, which claims the benefit of and priority to U.S. Provisional Application No. 63/404,841, filed Sep. 8, 2022 and U.S. Provisional Application No. 63/310,276, filed Feb. 15, 2022. A claim of priority is made to the aforementioned applications. The disclosures of the above applications are incorporated herein by reference in their entirety.

BACKGROUND

Snowmobiles are popular land vehicles used for transportation or recreation in cold and snowy conditions. All-terrain vehicles (ATVs), side-by-side vehicles (SxS or UTVs), and other four-wheeled vehicles are utilized in both on- and off-road recreational and productive activities.

In general, a snowmobile has a chassis on or around which the various components of the snowmobile are assembled. Typical snowmobiles include skis for steering a seat, handlebars, and an endless track for propulsion mounted to a central chassis. The skies serve to facilitate steering as well as to provide flotation of the front of the snowmobile over the snow in which it is operated. The skis may be pivoted to steer the snowmobile, for example, by turning the handlebars. The skis support the front of the snowmobile using a suspension system that may include suspension or connecting arms mounted to the snowmobile chassis that attach to and support a spindle. Each spindle may be attached to a ski to form the operative link in the steering system whereby movement of the handlebars causes rotation of the spindles, which causes the skis to turn.

Additionally, four-wheelers such as ATVs and UTVs can utilize one or more spindles. Although this disclosure generally discusses snowmobiles, methods and structures discussed herein in the context of snowmobiles may also be used with four-wheelers having wheels or tires, as opposed to skis.

SUMMARY

In some embodiments, a spindle includes a body and a fin, wherein the body has at least one recess and the fin has at least one window.

Embodiments further include a spindle with a body with a triangular cross-sectional shape.

Embodiments include a spindle that has a body with an outboard side, wherein the outboard side has a flat surface positioned between two inboard extending portions of the body.

In at least one embodiment a spindle includes a base defining a ski mount, an upper control arm mount, a body extending between the base and the upper control arm mount, and a lower control arm mount positioned on the body between the base and the upper control arm mount; wherein at least a first portion of the body between the base and the upper control arm mount is substantially flat along an outboard edge.

In some embodiments, a spindle includes: a base including a ski mount defining an axis of rotation; an upper control arm mount; a lower control arm mount; a tie rod mount including a fin extending therefrom; a body defining a leading edge extending between the base and the upper control arm mount, wherein a first portion of the leading edge extending from the base to adjacent the lower control arm mount extends along a first line that intersects a horizontal plane extending through the ski mount axis of rotation forward of the ski mount axis of rotation, wherein a second portion of the leading edge extending from adjacent the lower control arm mount to adjacent an upper connection between the fin and the body extends along a second line that intersects the horizontal plane rearward of the ski mount axis of rotation. Optionally the body further includes a third portion of the leading edge extending from adjacent the upper connection between the fin and the body to the upper control arm mount extends along a third line that intersects the horizontal plane forward of the ski mount axis of rotation.

In other embodiments, a spindle includes: a base including a ski mount defining an axis of rotation; an upper control arm mount; a lower control arm mount; a body defining a leading edge comprising a complex shape extending from the base to the upper control arm mount, wherein a first portion of the leading edge extending from the base to adjacent the lower control arm mount extends along a first line that intersects a horizontal plane extending through the ski mount axis of rotation forward of the ski mount axis of rotation, wherein a second portion of the leading edge extending from a point on the body between the lower control arm mount and the upper control arm mount extends along a second line that intersects the horizontal plane rearward of the ski mount axis of rotation.

In additional embodiments, a spindle includes: a base including a ski mount defining an axis of rotation; an upper control arm mount; a lower control arm mount; a body defining a leading edge extending between the base and the upper control arm mount, wherein a first portion of the leading edge extending from the base to adjacent the lower control arm mount extends along a first line that intersects a horizontal plane extending through the ski mount axis of rotation, wherein a second portion of the leading edge extending from adjacent the lower control arm mount to a point on the body between the upper control arm mount and the lower control arm mount extends along a second line that intersects the horizontal plane outboard of where the first line intersects the horizontal plane, and optionally wherein a third portion of the leading edge extending from the point to the upper control arm mount extends along a third line that intersects the horizontal plane outboard of where the first line intersects the horizontal plane.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 14B is an overhead view illustrating a first position of the suspension relative to the spindle, according to some embodiments.

DETAILED DESCRIPTION

Figure 1A:
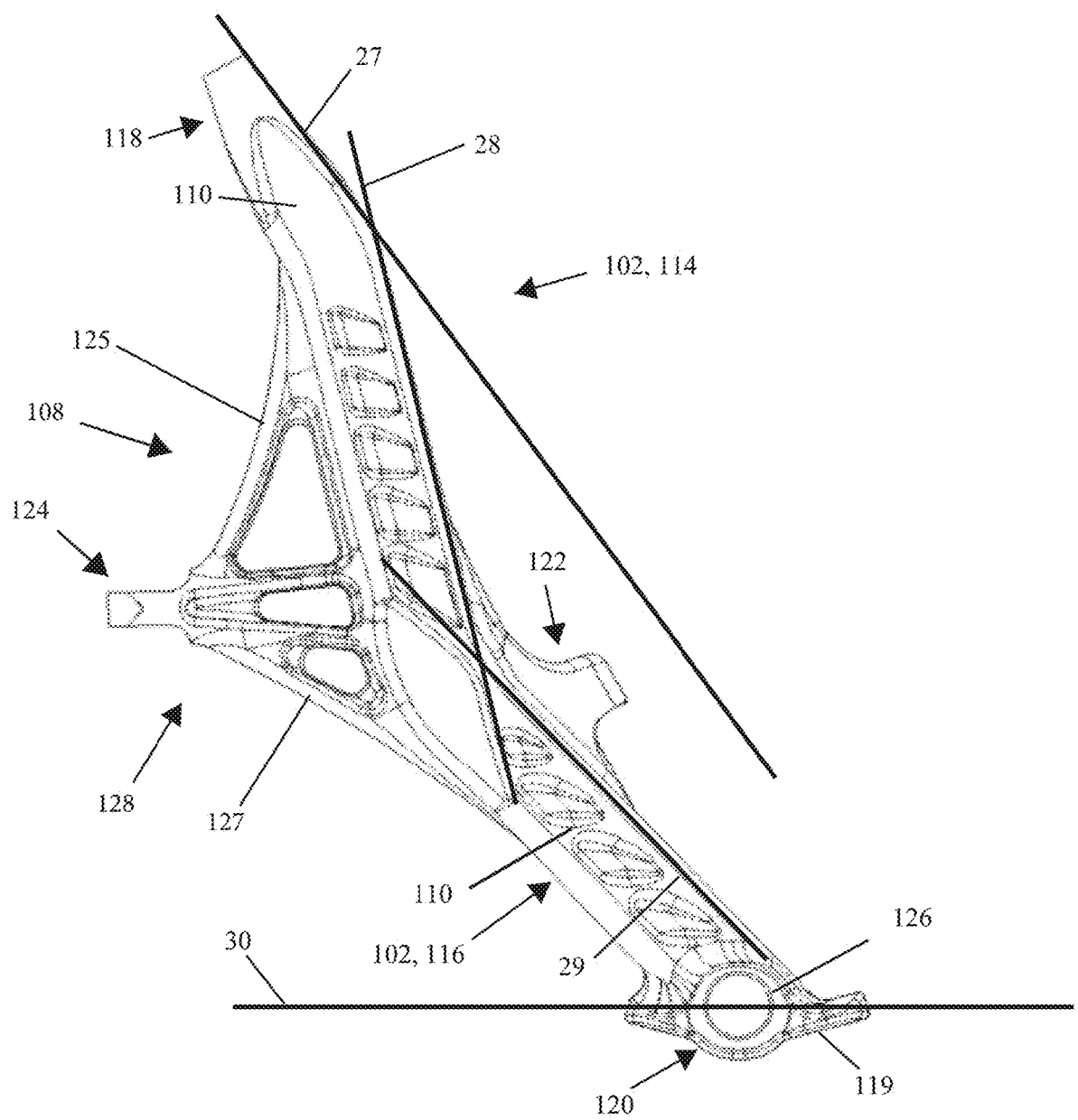
FIG. 1A illustrates an outboard side view of a spindle, according to some embodiments of this disclosure.
Figure 1B:
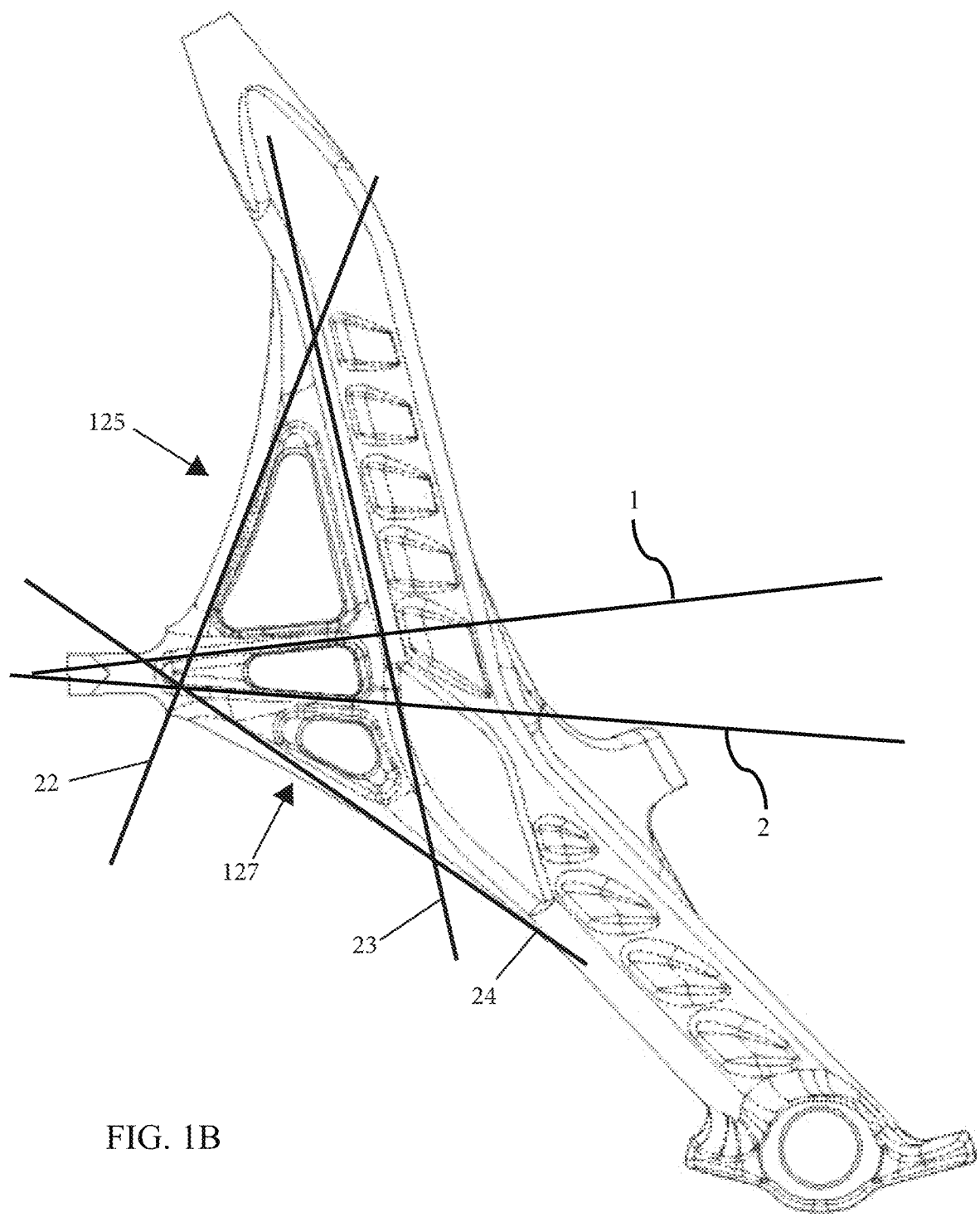
FIG. 1B illustrates an outboard side view of a spindle, according to some embodiments of this disclosure.

Embodiments of the present disclosure describe a spindle, a suspension system including one or more spindles, and recreational vehicles utilizing a suspension system including one or more spindles. Examples of recreational vehicles include snowmobiles, snow bikes, and four-wheelers such as all-terrain vehicles (ATVs) and side-by-side vehicles (SxS or UTVs).

A spindle as disclosed herein that includes a body with one or more mounts for securing a suspension component and a ground engaging member thereto. The body of the spindle may include one or more of a leading edge, a triangular cross-sectional shape, and/or an outboard edge/side that includes a flat surface. Illustrative benefits of a spindle disclosed herein may include being light, streamlined, having improved handling, experiencing reduced drag in the snow, glancing off the snow, and/or being able to withstand the forces experienced in use when attached to a suspension system. In one aspect, a spindle as disclosed herein may be incorporated into a snowmobile that may be ridden in deep snow or used for side hilling. When a snowmobile with a spindle as disclosed herein is used for side hilling, the flat surface of the spindle may contact the snow. In another aspect, the spindle is configured to deflect or otherwise shed snow during operation which may decrease the amount of drag experienced by the spindle while traversing through snow.

Referring to FIGS. 1A-9C, views of a spindle 100, according to an embodiment of this disclosure, are shown. As discussed below in greater detail with reference to FIGS. 10-17, the spindle 100 may be coupled to a suspension of a snowmobile and may be utilized with different snowmobile embodiments. The snowmobile includes a longitudinal axis/centerline 21 (see e.g., FIG. 13C). In at least one embodiment, the spindle 100 includes a body 102, a fin 128, an upper control arm mount 118, a base 119 that includes a ski mount 120, a lower control arm mount 122, and/or a tie rod mount 124 (see e.g., FIG. 1A).

In some implementations, the base 119 is rectangular shaped. The base 119 includes a base longitudinal axis, extending from the leading edge to the trailing edge of the base 119, and forms a part of a vertical plane 146 (see e.g., FIGS. 2B, 3, 5F, and 8A). The longitudinal axis of the base 119 (represented by vertical plane 146) is perpendicular/orthogonal to the long axis/axis of rotation 13 of the ski mount 120 (see e.g., FIG. 10C; see also FIG. 9B where the long axis 13 extends into the page). When the spindle 100 is viewed from above, the base longitudinal axis (represented by vertical plane 146) may be positioned between a vertical plane 144 that extends through the upper control arm mount 118 and the lower control arm mount 122 and a vertical plane 3 that extends through the tie rod mount 124 and is parallel to the vertical plane 144 (see e.g., FIG. 2B). Similarly, when the spindle 100 is viewed from the front or back, vertical plane 146 is positioned outboard to vertical plane 144 (see e.g., FIG. 8A).

The spindle body 102 includes an upper portion 114, a lower portion 116, a leading edge 106, a trailing edge 108, an outboard side/edge 110, and an inboard side/edge 112 (see e.g., FIGS. 1A, 3, 4A, and 5). In some embodiments, the upper portion 114 of the spindle body 102 extends between the upper control arm mount 118 and the lower control arm mount 122, and the lower portion 116 extends between the lower control arm mount 122 and the ski mount 120 (see also FIGS. 2A, 5A, and 7). In a further embodiment, the lower control arm mount 122 extends forward at an oblique angle to base longitudinal axis 146. In one example, the lower control arm mount 122 extends inward (see e.g., FIGS. 2A and 5).

The leading edge 106, trailing edge 108, outboard side 110, and inboard side 112 extend from the upper control arm mount 118 down to the base 119 (see e.g., FIGS. 1A, 2A, 3, and 5). The inboard side 112 and the outboard side 110 may intersect at the leading edge 106. In some embodiments, the outboard side 110, inboard side 112, leading edge 106, and/or trailing edge 108 are curvilinear. In one aspect, when the spindle 100 is attached to a snowmobile, the leading edge 106 is configured to reduce drag as the snowmobile is ridden and the spindle 100 travels through the snow. In a further aspect, the leading edge 106 is configured to point out of, or away from, the snow during side hilling with a snowmobile. In a further aspect, when the spindle 100 is attached to a snowmobile, the outboard side 110 is configured to glance off the snow instead of digging into the snow.

The leading edge 106 may also be described as comprising a complex shape extending from the base 119 to the upper control arm mount 118, wherein a first portion of the leading edge 106 extending from the base 119 to adjacent the lower control arm mount 122 extends along a first line (see e.g., line 29 of FIG. 1A) that intersects a horizontal plane 30 extending through the axis of rotation 13 of the ski mount 120 forward of the axis of rotation 13 of the ski mount 120, wherein a second portion of the leading edge 106 extending from a point on the spindle body 102 between the lower control arm mount 122 and the upper control arm mount 118 extends along a second line (see e.g., line 28 of FIG. 1A) that intersects the horizontal plane 30 rearward of the axis of rotation 13 of the ski mount 120. It is to be understood that the leading edge 106 may extend continuously along the front of the body 102, or may be comprised of two or more separated or discontinuous sections.

The leading edge 106, as viewed from the outboard side, may be described as having a first/lower portion 116 extending from the base 119 to adjacent the lower control arm mount 122 and a second portion 114 extending from adjacent the lower control arm mount 122 to adjacent an upper connection between the fin 128 and the spindle body 102 (see e.g., FIG. 1A). The first portion 116 may extend along a first line (e.g. line 29) that intersects a horizontal plane 30 extending through the axis of rotation 13 of the ski mount 120 to a position forward of the axis of rotation 13 of the ski mount 120. The second portion 114 may extend along a second line (e.g., line 28) that intersects the horizontal plane 30 rearward of the axis of rotation 13 of the ski mount 120. The leading edge 106 may further include a third portion extending from adjacent the upper connection between the fin 128 and the spindle body 102 to the upper control arm mount 118 that extends along a third line 27 that intersects the horizontal plane 30 forward of the axis of rotation 13 of the ski mount 120.

Figure 8A:
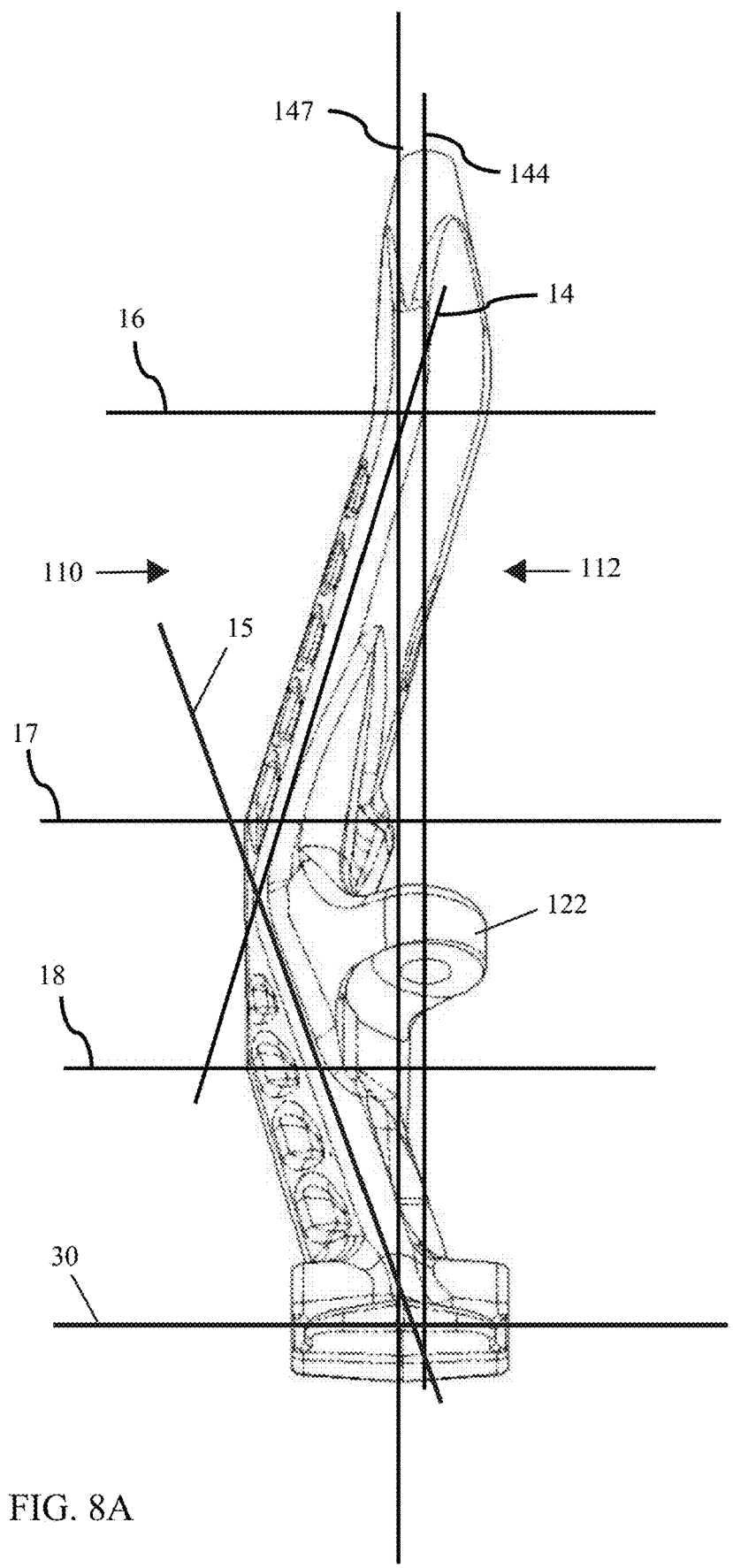
FIG. 8A is a front view of the spindle, according to some embodiments of this disclosure.

The leading edge 106, as viewed from the front, may be described as extending between the base 119 and the upper control arm mount 118 and including a first portion extending from the base to adjacent the lower control arm mount (along e.g., line 15 of FIG. 8A) and a second portion of the leading edge 106 extending from adjacent the lower control arm mount 122 to a point on the spindle body 102 between the upper control arm mount 118 and the lower control arm mount 122 (along e.g., line 14 of FIG. 8A). The first portion of the leading edge 106 may extend along the line 15 that intersects the horizontal plane 30 extending through the axis of rotation 13 of the ski mount 120. The second portion of the leading edge 106 extends along the line 14 that intersects the horizontal plane 30 outboard of where the line 15 intersects the horizontal plane 30. The leading edge 106 may further include a third portion extending from the point to the upper control arm mount 118. The third portion may extend along a third line that extends along the vertical plane 144 that intersects the horizontal plane 30. In some implementations, the third line intersects the horizontal plane 30 inboard of where the first line intersects the horizontal plane 30 (see e.g., line 15 and vertical plane 144 of FIG. 8A). In other implementations, the third line intersects the horizontal plane 30 outboard of where the first line intersects the horizontal plane 30 (not shown).

Figure 4A:
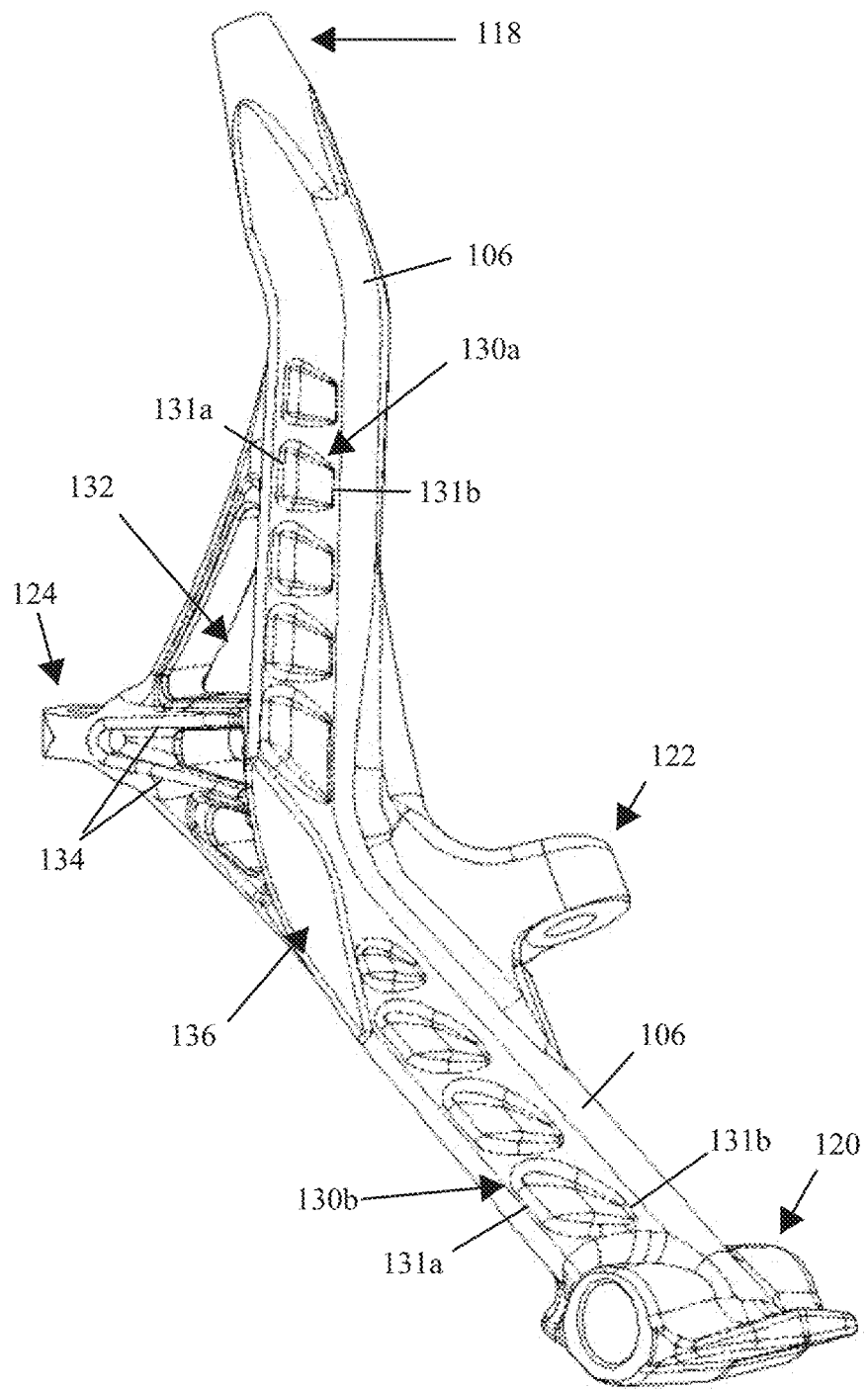
FIG. 4A is a perspective outboard front side view of the spindle, according to some embodiments of this disclosure.
Figure 4B:
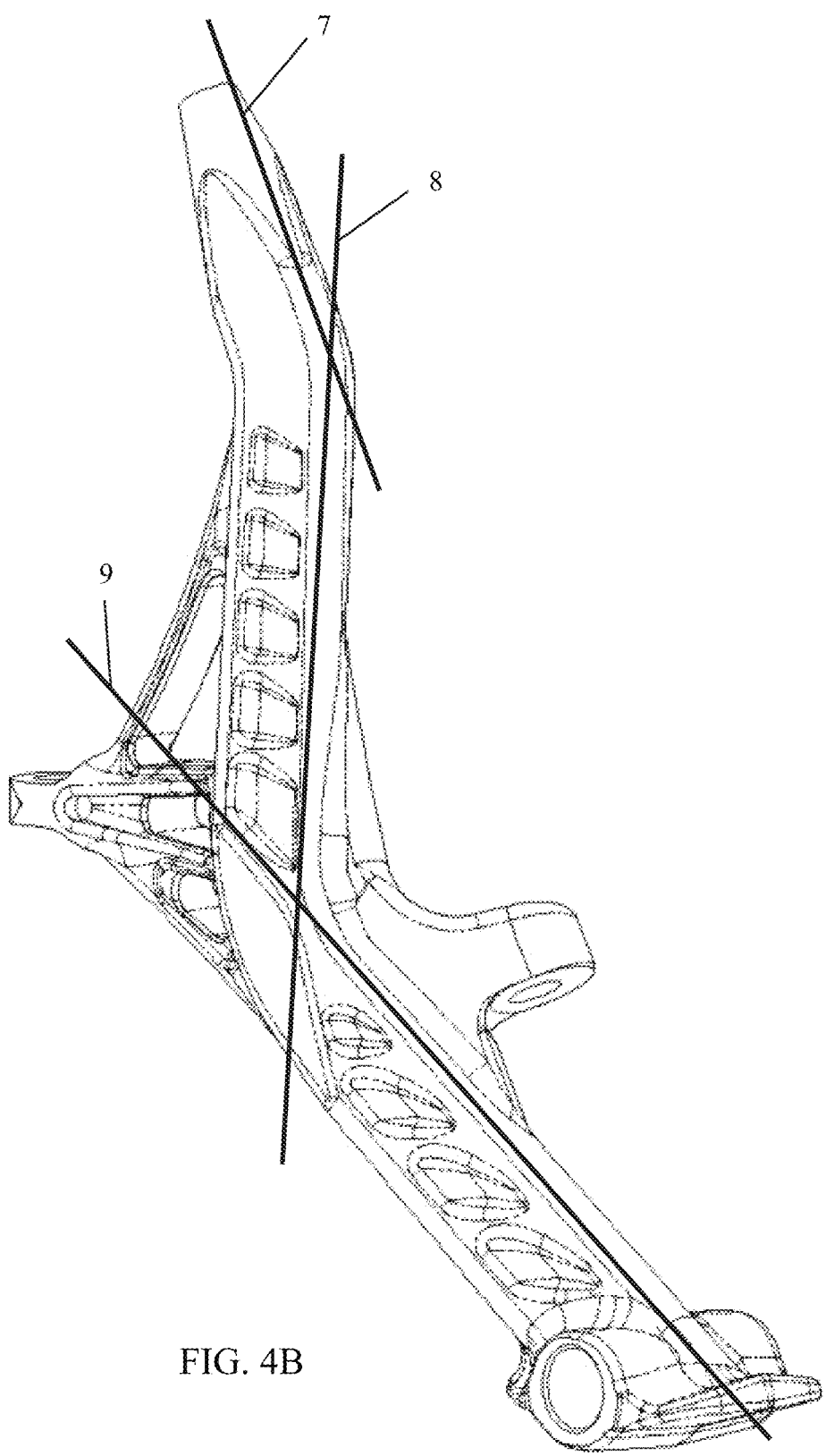
FIG. 4B is a perspective outboard front side view of the spindle, according to some embodiments of this disclosure.
Figure 5:
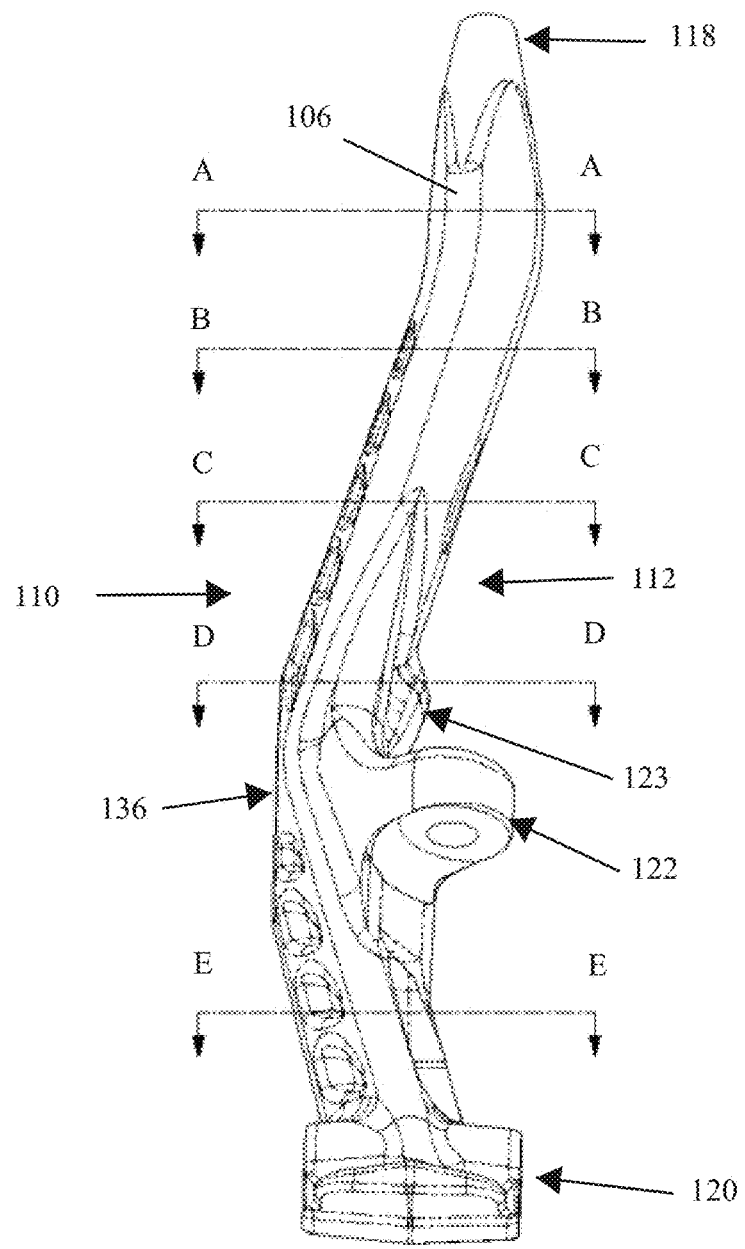
FIG. 5 is a front view of the spindle, according to some embodiments of this disclosure.

In at least one embodiment, the spindle body 102 is curvilinear (see e.g., FIG. 5). In some embodiments, the spindle body 102 has two bends in a forward-rearward direction when viewed along the outboard side 110. For example, when viewed from the outboard side, the leading edge 106 may include two bends (see e.g., intersection of lines 27 and 28 and intersection of line 28 and 29 of FIG. 1A, see also FIG. 4A). In some embodiments, the spindle body 102 has two bends in an inboard-outboard direction when viewed from the front (see e.g., FIGS. 2A, 2B, 4B, and 8A). Although shown with two bends from each view, it is to be understood that the number of bends is not limited, and the body may contain more or less than two bends in either direction.

In one example, at least a portion of the spindle body 102 is V-shaped. The arms of the V-shape may be formed by the upper portion 114 and the lower portion 116 of the spindle body 102, as illustrated by lines 28 and 29 in FIG. 1A and by lines 4 and 5 in FIG. 2B. The angle between the upper and lower portions 114, 116 may be an obtuse angle (see e.g., FIG. 1A) or approximately 90° (see e.g., FIG. 2B). The vertex of the V-shape may be positioned between the tie rod mount 124 and the lower control arm mount 122 (see e.g., FIGS. 1A, 4B, 8B), between the upper control arm mount 118 and the lower control arm mount 122 (see e.g., FIG. 2B), and/or adjacent to the lower control arm mount 122 (see e.g., FIG. 8A). The vertex of the V-shape may come to a point or be flat. For example, the outboard side 110 of the spindle body 102 forms a V-shape with the flat surface 136 forming a flat vertex for the V-shape (see e.g., the top view of FIG. 2B and the front view of FIG. 8A).

Figure 8B:
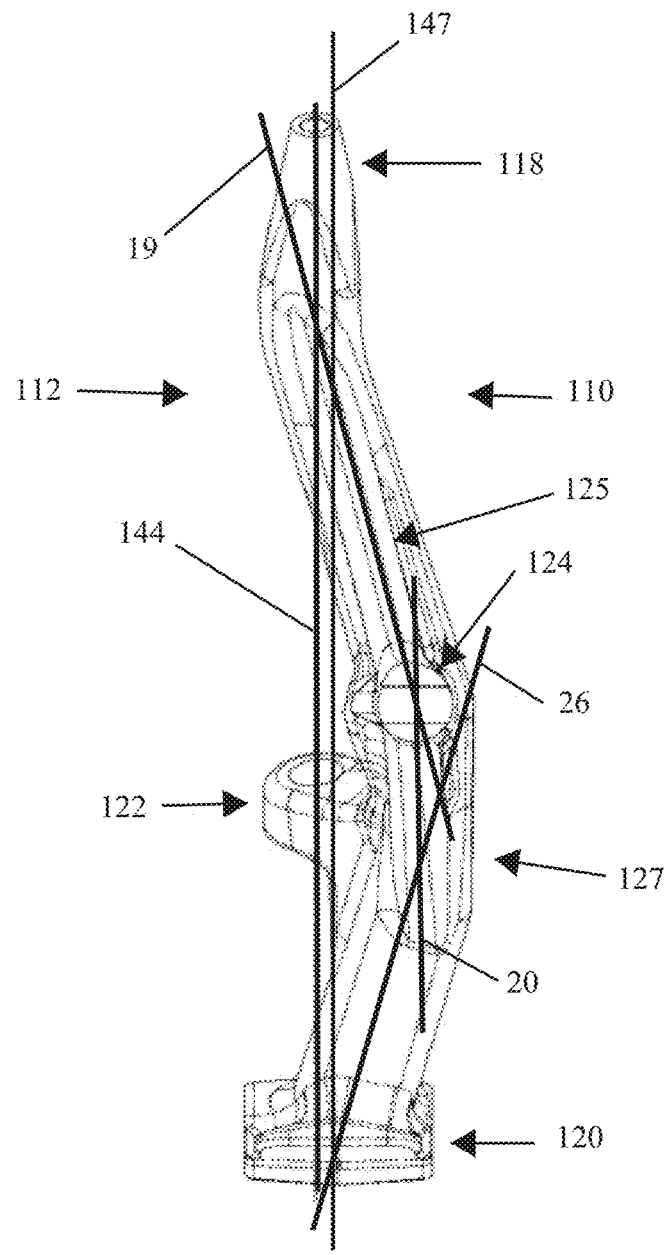
FIG. 8B is a rear view of the spindle, according to some embodiments of this disclosure.

Lines 28 and 29 of FIG. 1A illustrate a V-shape from an outboard view with line 28 extending along the leading edge 106 of the upper portion 114 of the spindle body 102 and line 29 extending along the leading edge 106 of the lower portion 116 of the spindle body 102. Lines 4 and 5 of FIG. 2B illustrate a V-shape from a top view with line 4 extending along the leading edge 106 of the upper portion 114 of the spindle body 102 and line 5 extending along the leading edge 106 of the lower portion 116 of the spindle body 102. Lines 8 and 9 of FIG. 4B illustrate a V-shape from an outboard perspective view with line 8 extending along the leading edge 106 of the upper portion 114 of the spindle body 102 and line 9 extending along the leading edge of the lower portion of the spindle body 102. Lines 14 and 15 of FIG. 8A illustrate a V-shape from a front view with line 14 extending along the upper portion 114 of the spindle body 102 and line 15 extending along the lower portion 116 of the spindle body 102. Lines 19 and 26 of FIG. 8B illustrate a V-shape from a rear view with line 19 extending along the upper portion 114 of the spindle body 102 and line 26 extending along the lower portion 116 of the spindle body.

In some embodiments, the spindle body 102 has a curvilinear perimeter. In one example, the spindle body 102 has a triangular cross-sectional shape (see e.g., FIG. 5A). The spindle body 102 may have a triangular cross-sectional shape along at least some of the length of the spindle body 102. The triangular cross-sectional shape is most clearly seen by an intermediate form 101 of the spindle body 102, as shown in FIG. 5F. Lines 11 and 12 of FIG. 5F illustrate a V-shape of from a top front perspective view with line 11 extending along a leading edge of the upper portion of the intermediate form 101 of the spindle body and line 12 extending along a leading edge of a lower portion of the intermediate form 101 of the spindle body 102.

In some implementations, the spindle body 102 from the upper control arm mount 118 down to the base 119 has a v-shape or a triangular cross-sectional shape as shown in FIGS. 5A-5E that is at least partially defined by the inboard side 112 and the outboard side 110 intersecting at the leading edge 106 which defines the vertex. In some implementations, one or more cross-sections of the spindle body 102 includes one or more concave sides (see e.g., FIGS. 5C and 5E). Concave sides may be defined by recesses 129, 130 which may be positioned along the length of the spindle body 102, as discussed below in greater detail.

Figures 5A, 5B, 5C, 5D, 5E:
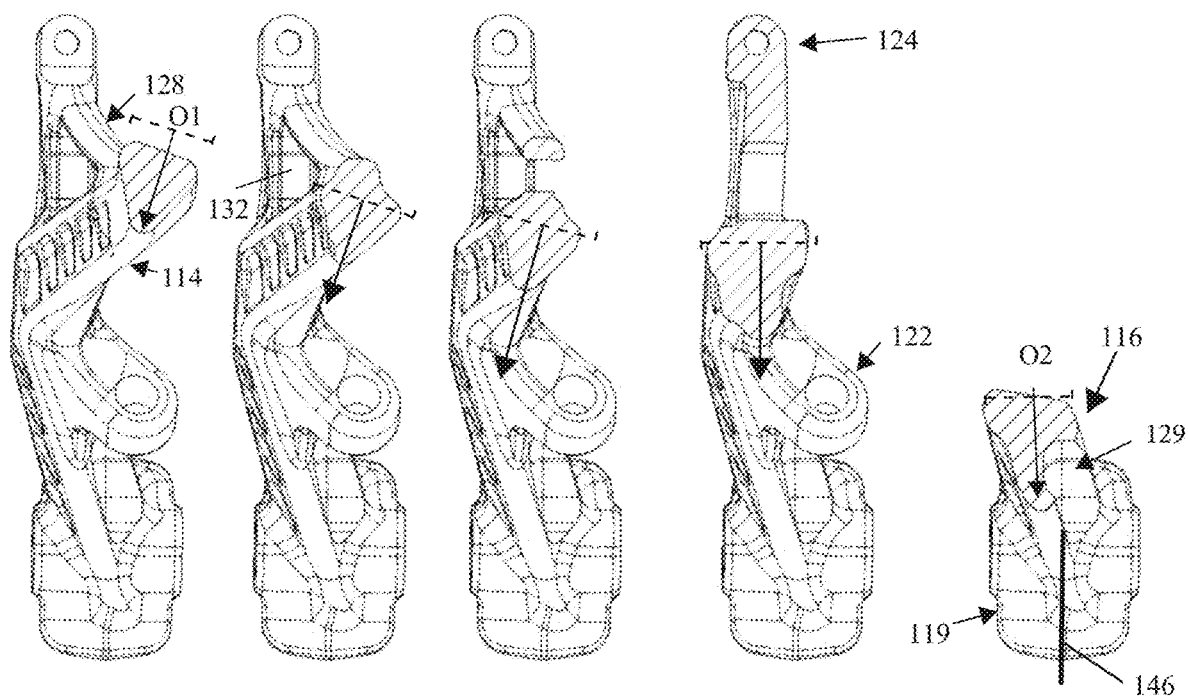
FIG. 5A is a cross-sectional perspective top view of the spindle taken at line A-A, according to some embodiments of this disclosure.
FIG. 5B is a cross-sectional perspective top view of the spindle taken at line B-B, according to some embodiments of this disclosure.
FIG. 5C is a cross-sectional perspective top view of the spindle taken at line C-C, according to some embodiments of this disclosure.
FIG. 5D is a cross-sectional perspective top view of the spindle taken at line D-D, according to some embodiments of this disclosure.
FIG. 5E is a cross-sectional perspective top view of the spindle taken at line E-E, according to some embodiments of this disclosure.
Figure 5F:
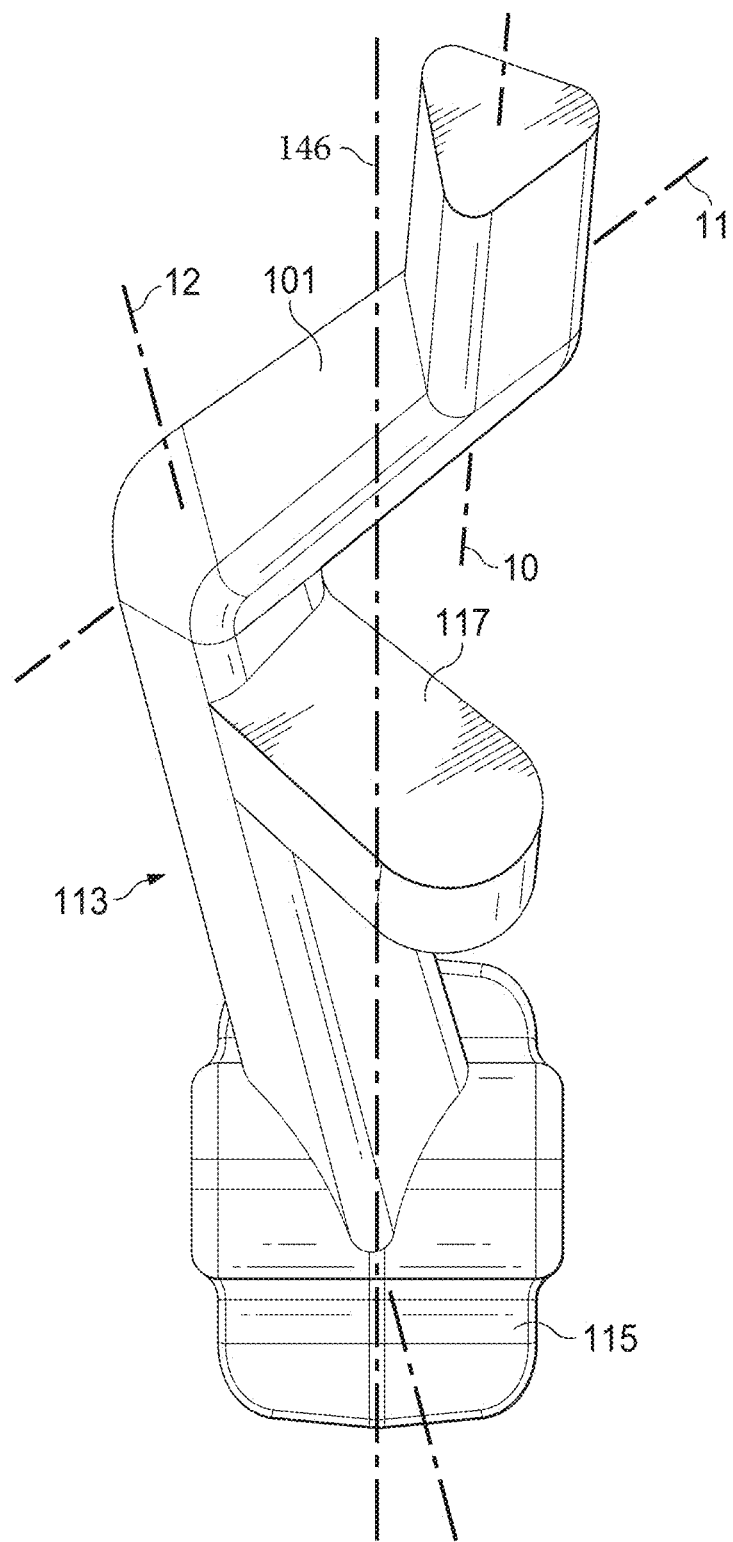
FIG. 5F is a front view illustrating an alternative form of the spindle body, according to some embodiments of this disclosure.

As shown in FIGS. 5A-E, the orientation of the leading edge 106 and the v-shape or triangle changes from the top of the spindle body 102, arrow O1, down toward the bottom of the spindle body 102, arrow O2 (see e.g., FIGS. 5A and E). Arrows O1 and O2 are orthogonal to a dashed line extending between the inboard and outboard sides of the spindle body 102. Arrow O1 is oriented at an acute angle to the base longitudinal axis 146. Arrow O2 may extend from the rear wall of the triangle through the leading edge 106 so that the arrow O2 extends substantially perpendicular to the direction of the ski axle or axis of rotation 13 of the mount hole 126 in the ski mount 120. In one aspect, this orientation of arrow O2 reduces drag at that location.

In a non-limiting example, the orientation of the leading edge 106 rotates inboardly from an outboard facing direction to a forward or inboard facing direction while moving down the spindle body 102 from the upper control arm mount 118 to the base 119 (see e.g., FIGS. 5A and E). In some implementations, the change in the orientation of the leading edge 106 while moving down the spindle body 102 is linear. In one non-limiting example, the leading edge 106 rotates approximately 10° to 30°, and optionally from 15° to 25°, and optionally 20° while moving along the spindle body 102. As one non-limiting example, the leading edge 106 adjacent to the upper control arm mount 118 is oriented approximately 20° in an outboard direction relative to the base longitudinal axis 146 while the leading edge 106 adjacent to the base 119 is oriented approximately parallel to the base longitudinal axis 146) (0°).

In at least one embodiment, the volume of the spindle body 102 changes while moving down the spindle body 102 from the upper control arm mount 118 to the base 119. The volume of the spindle body 102 adjacent to the upper control arm mount 118 may be less than the volume of the spindle body 102 adjacent to the base 119. In some embodiments, the volume of the spindle body 102 adjacent to the upper control arm mount 118 is approximately 65-85% of the volume of the spindle body 102 adjacent to the base 119, and optionally 73-80% of the volume of the spindle body 102 adjacent to the base 119. In one non-limiting example, the volume of the spindle body 102 adjacent to the upper control arm mount 118 is less than the volume at the bottom by a factor of 0.3—in other words if the volume at the top is 1, the volume at the bottom is 1.3. In some embodiments, the change in volume is linear. In other embodiments, the change in volume is non-linear.

In one aspect, when a spindle 100 with a v- or triangular cross-sectional shape is attached to a snowmobile, a vertex of the v- or triangle forms the spindle's leading edge 106 that leads the spindle 100 into the snow and/or sheds snow around the spindle 100 to reduce drag. A bottom flat triangle shown in FIG. 5E is provided where the lower portion 116 is joined to the ski mount 120 The bottom flat triangle is parallel with the ski axle (or a horizontal plane extending through the axis of rotation 13 of the mount hole 126 in the ski mount 120) to maintain a substantially triangular cross section with the leading edge 106 directly forward along the ski mount 120 and positioned along the center of the ski mount 120 (e.g., along the base longitudinal axis 146). Due to the shape, the profile of the spindle body 102 is narrower along the forward portion of the base 119 and increases to a wider profile along a rearward portion of the base 119.

The spindle body 102 may further include a flat surface 136. In one example, the perimeter of the flat surface 136 is curvilinear (see e.g., FIG. 4A). In another example, the flat surface 136 is a quadrilateral. In some embodiments, a flat surface 136 is located on the outboard side 110 of the spindle body 102 (see e.g., FIGS. 2B and 5), and may be positioned at least partially, and optionally entirely, outboard of the base 119. In one example, the flat surface 136 is between two inboard/inward extending portions of the outboard side 110. For example, the flat surface 136 is positioned between the upper portion 114 and the lower portion 116, and the upper portion 114 of the outboard side 110 extends inward from the flat surface 136 and the lower portion 116 of the outboard side 110 extends inward from the flat surface 136 (see e.g., FIG. 2B with lines 4 and 5 indicating the orientation of the two inward extending portions and line 6 indicating orientation of the flat surface 136 which may be parallel to the base longitudinal axis 146 and the vertical plane 144, and perpendicular to the axis of rotation 13 of the ski mount 120; see also FIG. 5). The flat surface 136 may extend vertically from a point on the spindle body 102 positioned below the lower control arm mount 122 to a point on the spindle body 102 positioned above the lower control arm mount 122 (see e.g., horizontal lines 17 and 18 of FIG. 8A). In one aspect, the flat surface 136 provides the spindle body 102 with a narrower width. Thus, when the spindle 100 is attached to a recreational vehicle, the vehicle width is narrower which may improve its ability to move between trees and/or through the snow. In another aspect, during side hilling, where typically the skis are turned away from the hill, the flat surface 136 may be the point of contact between the spindle 100 and the snow. In a further aspect, when the spindle 100 is attached to a snowmobile, the flat surface 136 is configured to glance off the snow instead of digging into the snow.

The spindle body 102 may include a steering stop 123. In at least one embodiment, a steering stop 123 is integrated into the spindle body 102 (see e.g., FIGS. 5 and 14-15). In some embodiments, the steering stop 123 is located along the inboard side 112 of the spindle body 102 (see e.g., FIG. 6). In one example, the steering stop 123 is vertically positioned between the lower control arm mount 122 and the tie rod mount 124 (see e.g., FIGS. 7 and 15). In other embodiments, the steering stop 123 is an inwardly extending, triangular shaped, portion of the spindle body 102 that is wider at the top than at the bottom. In one example, the narrower portion ends just above a top surface of the lower control arm mount 122.

In one aspect, steering stop 123 is configured to prevent the suspension from oversteering or going beyond a desired endpoint. For example, the steering stop 123 may prevent the turning of the spindle beyond approximately 180 degrees. In some embodiments, the steering stop 123 may be configured to contact a face 505 of the knuckle 507 (see e.g., FIGS. 14A and 15A). The material used for the knuckle 507 and the spindle 100 may be resistant to deformation. In a further aspect, the steering stop 123 is configured to provide a hard stop just before the full steering point is reached. In some embodiments, the stop angle is the same throughout the stroke of the shock. In another aspect, when the spindle 100 is attached to a suspension system, the steering stop 123 may prevent the steering from binding up while riding. In an additional aspect, the steering stop 123 may eliminate or reduce buckling/compression of the tie rod 506, thereby making it easier to return the steering back to center.

Figure 14A:
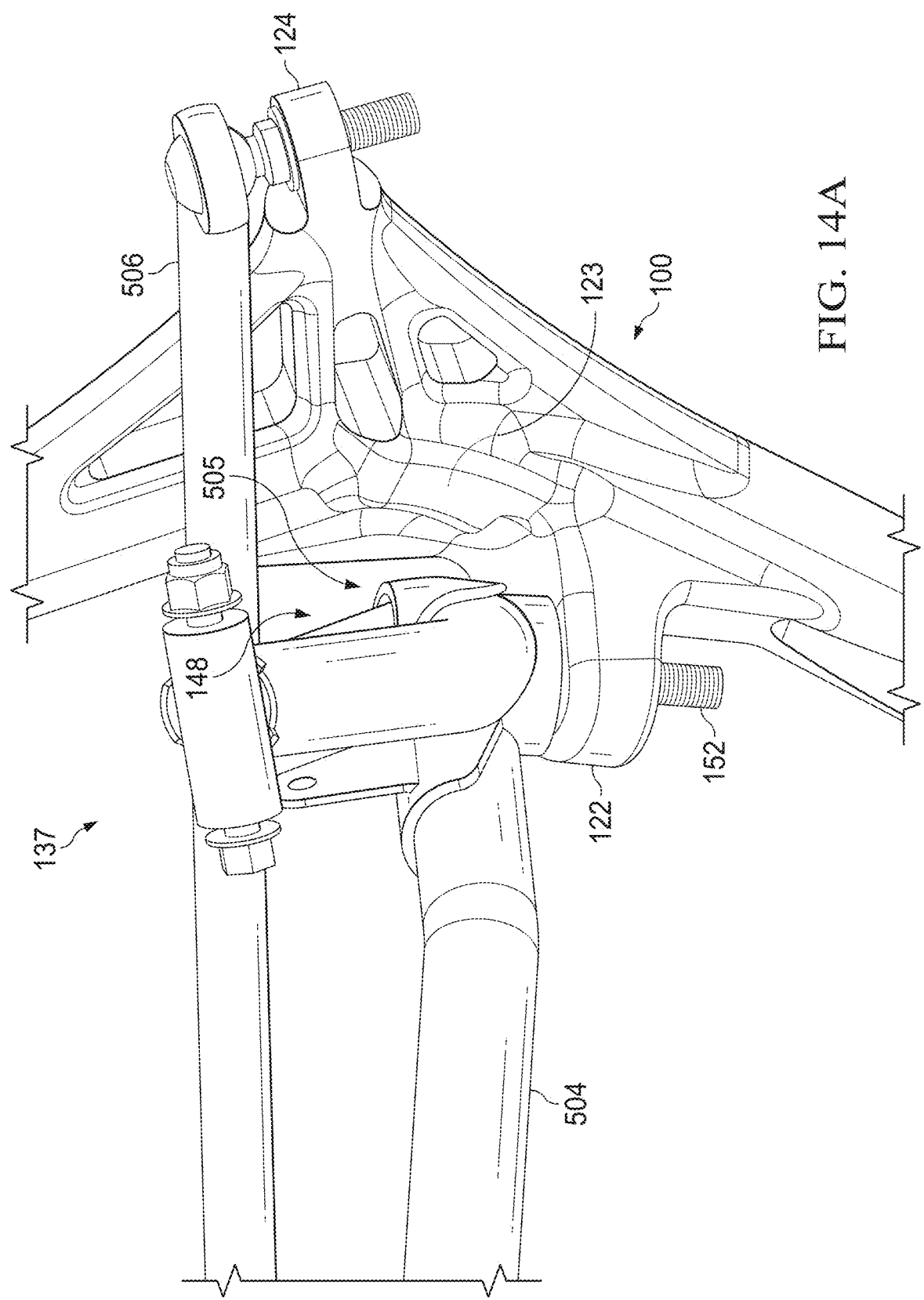
FIG. 14A is a rear view illustrating a first position of the suspension relative to the spindle, according to some embodiments.

FIGS. 14A-B illustrate a first steering position 137 where the skis 510 are substantially parallel to the snowmobile longitudinal axis 21. For example, the ski 510 in the first steering position may be oriented approximately 180° relative to the snowmobile centerline 21. In another example, the ski 510 in the first steering position 137 may be oriented with a slight inward bias at the front. In one aspect, the inward bias may prevent or inhibit darting. In the first steering position 137, there is a space 148 between the coupling housing/knuckle 505 of the front suspension and the steering stop 123.

Figure 15A:
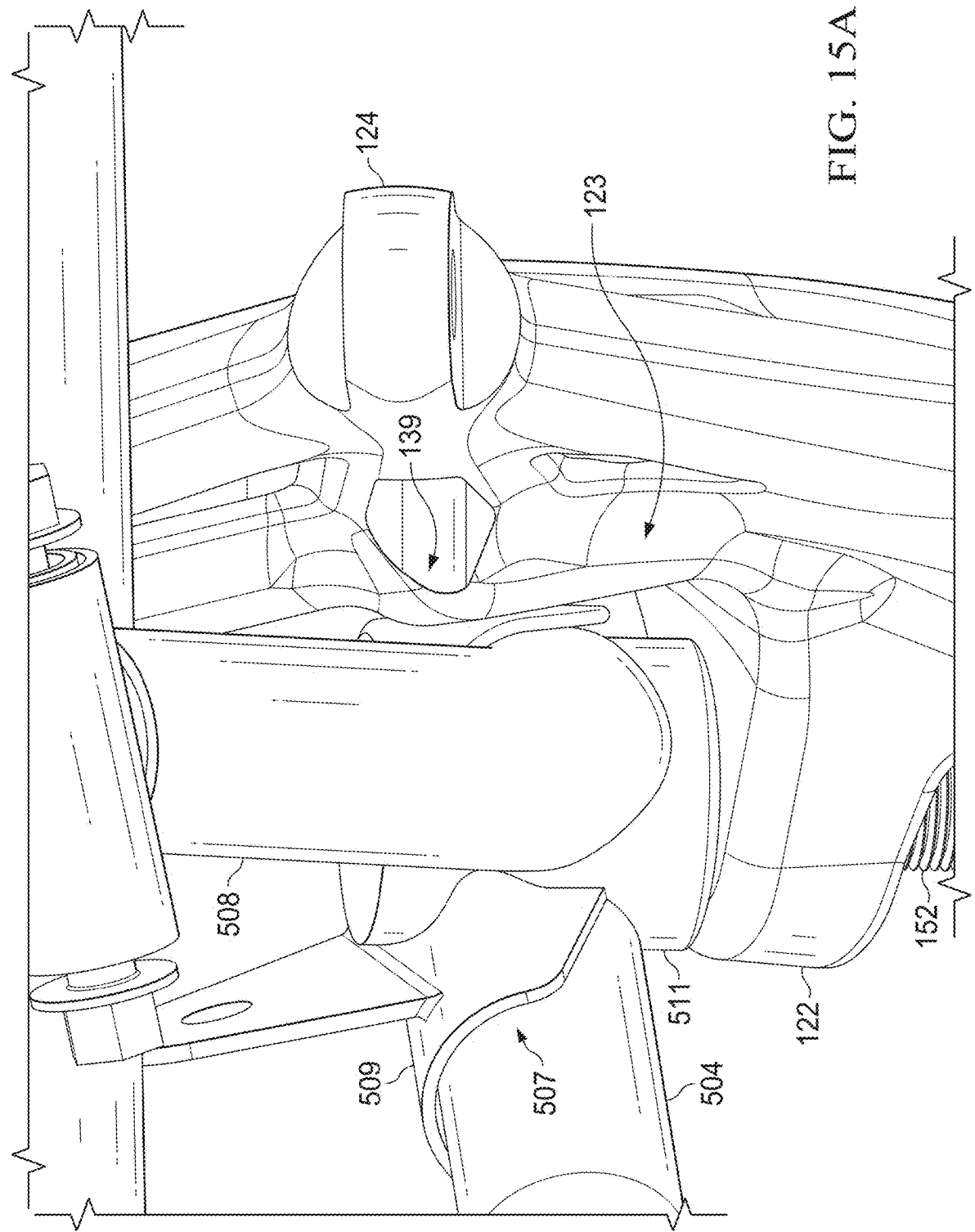
FIG. 15A is a rear view illustrating a second position of the suspension relative to the spindle, according to some embodiments.
Figure 15B:
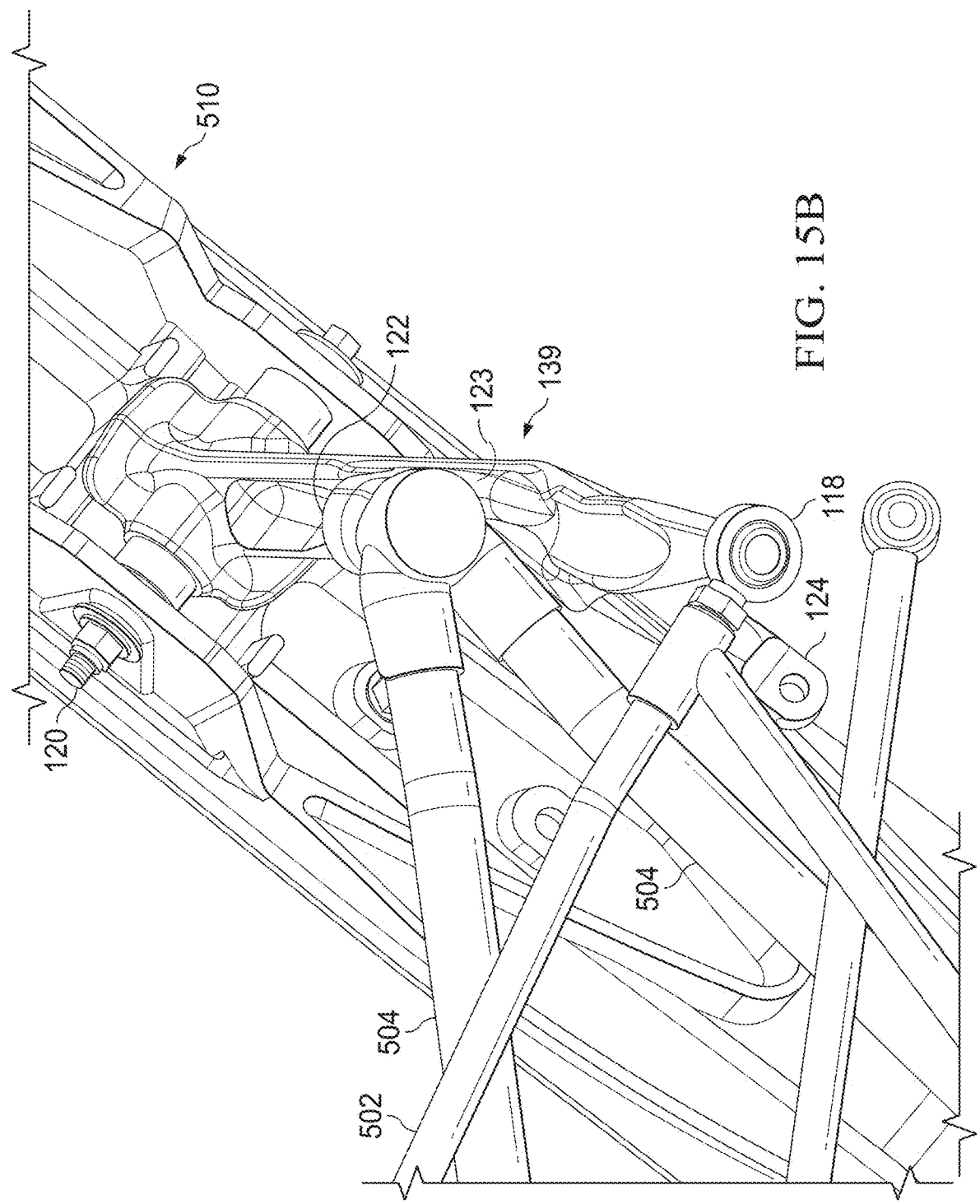
FIG. 15B is an overhead view illustrating a second position of the suspension relative to the spindle, according to some embodiments.

FIGS. 15A-B illustrate a stop position 139 where the ski 510 is positioned at an angle to the snowmobile longitudinal axis 21. The ski angle in the stop position 139 may be at approximately 135° to 145° relative to the snowmobile longitudinal axis 21. In the stop position 139, a face 505 of the knuckle 507 may contact the steering stop 123 (see e.g., FIG. 15A).

Figure 2A:
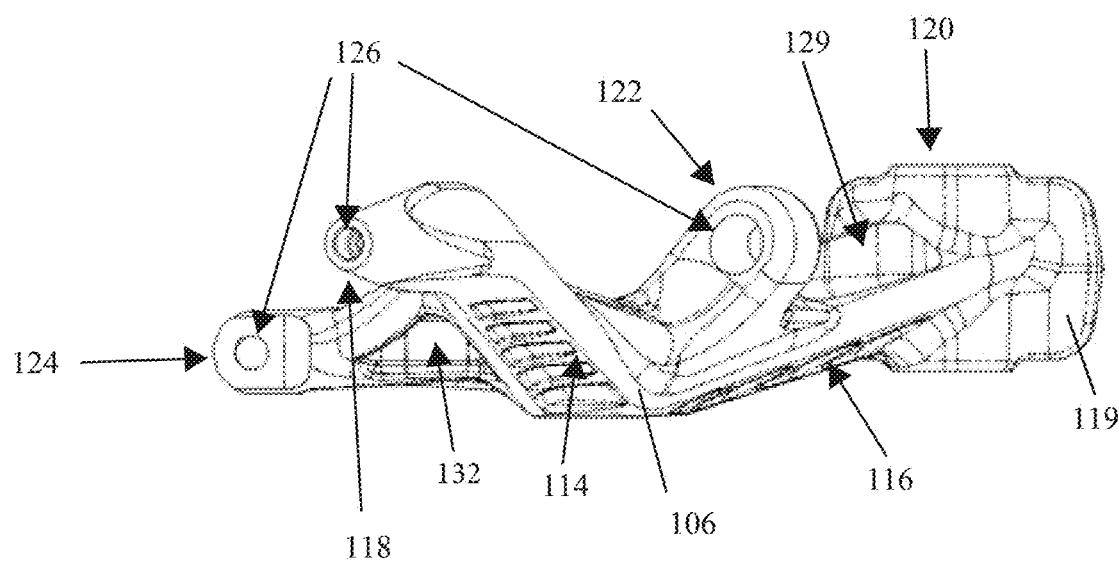
FIG. 2A illustrates a top view of the spindle according to some embodiments.
Figure 2B:
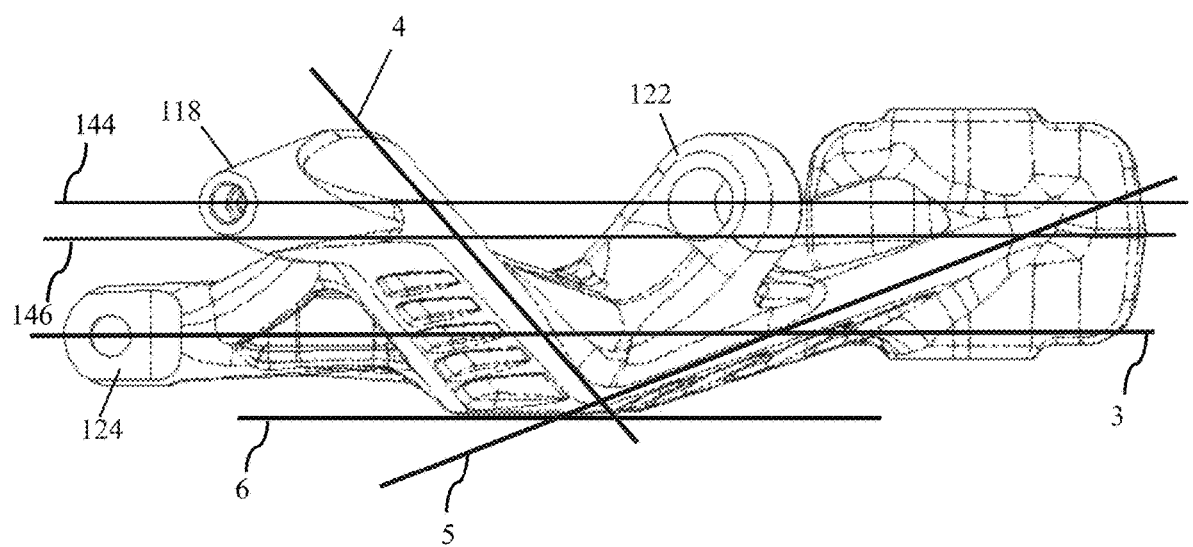
FIG. 2B illustrates a top view of the spindle according to some embodiments.
Figure 3:
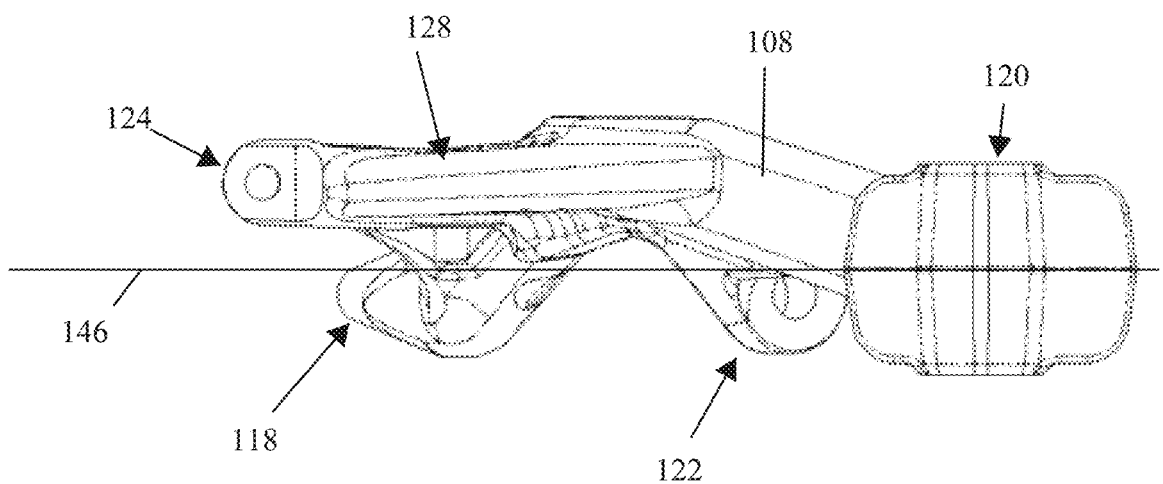
FIG. 3 illustrates a bottom view of the spindle, according to some embodiments.
Figure 6:
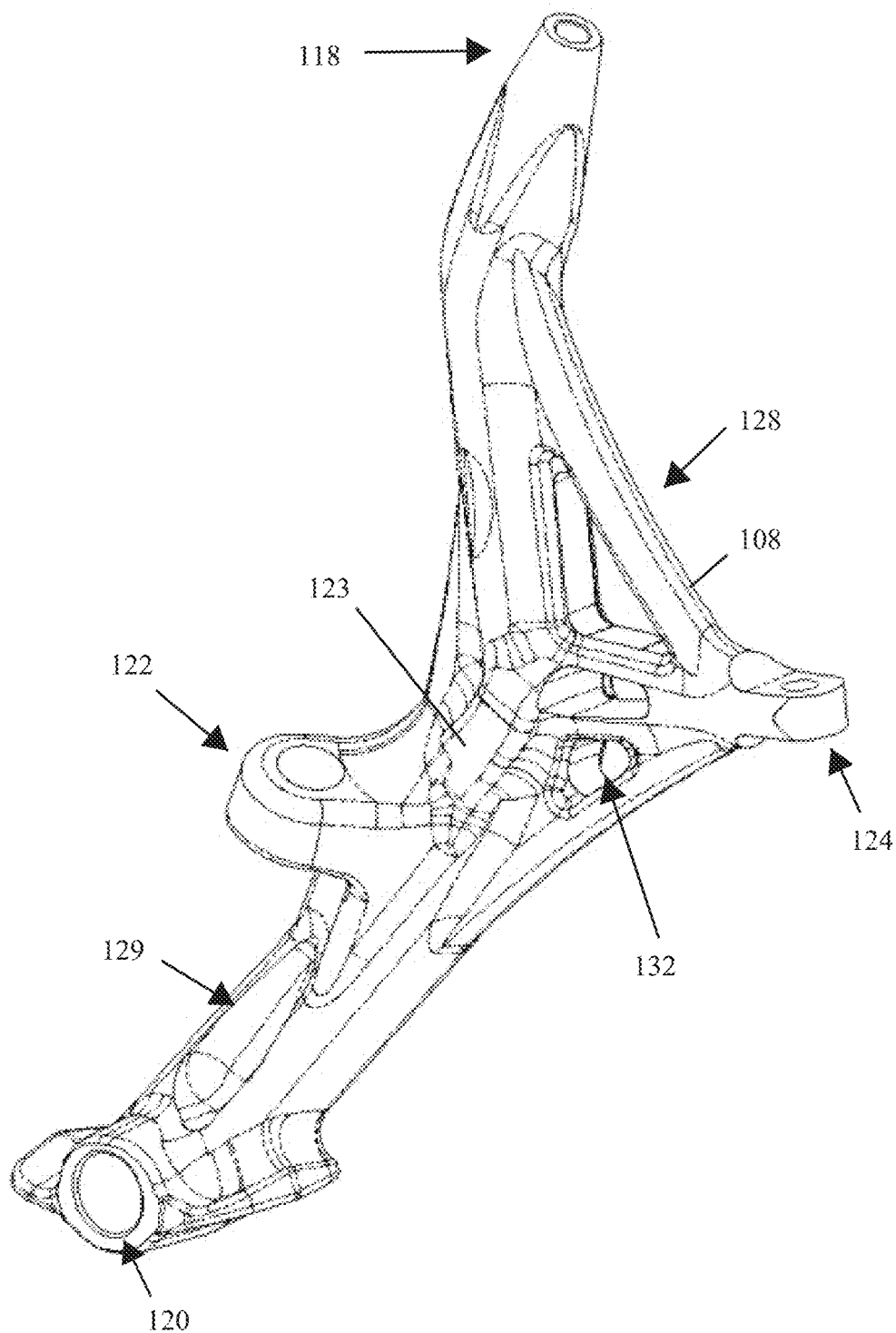
FIG. 6 is a perspective inboard rear side view of the spindle, according to some embodiments of this disclosure.
Figure 7:
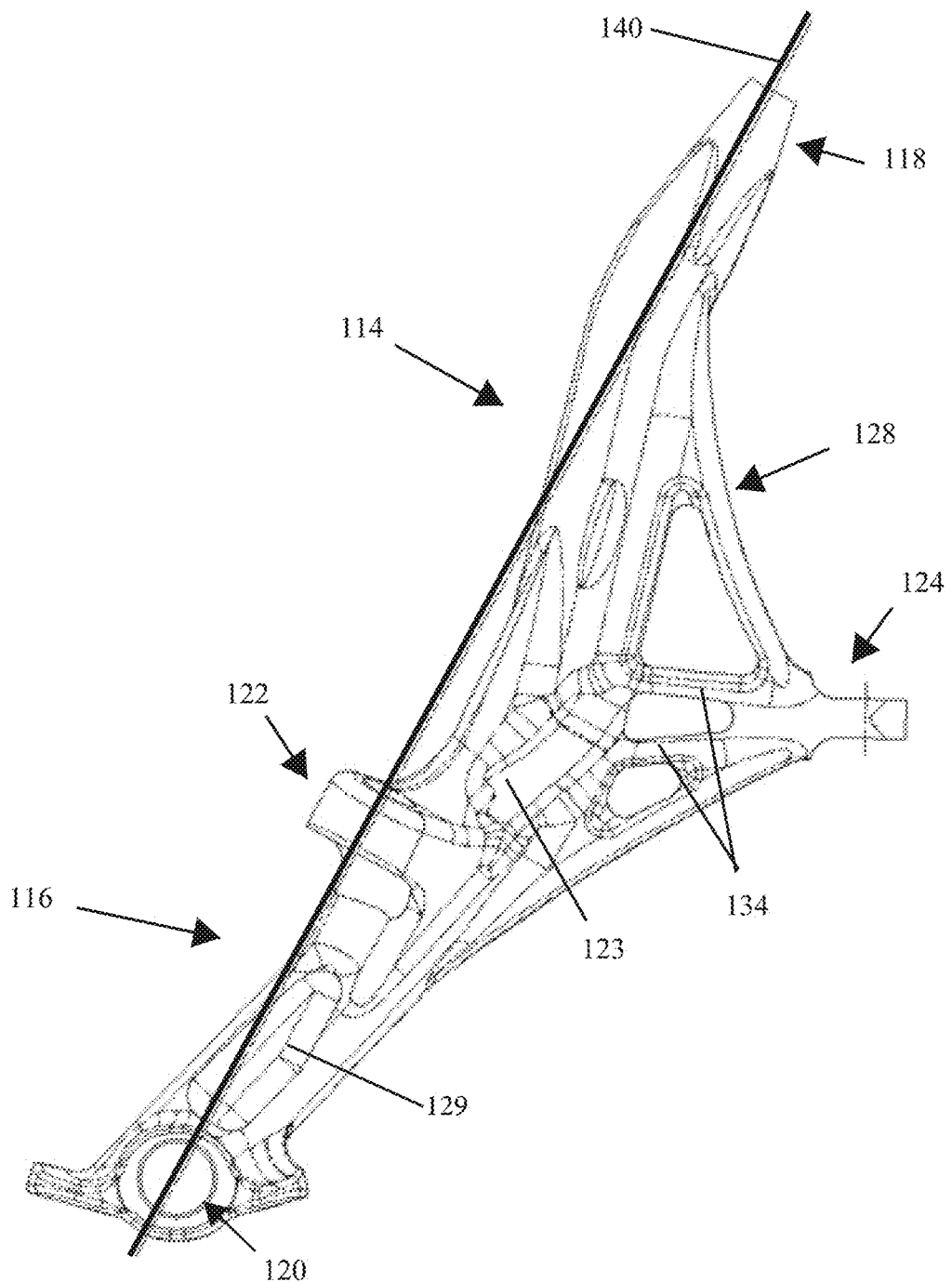
FIG. 7 is an inboard side view of the spindle, according to some embodiments of this disclosure.

In some embodiments, the spindle body 102 further includes a recess 129 positioned between the lower control arm mount 122 and the ski mount 120 (see e.g., FIGS. 2A and 6-7). The recess 129 may have a curvilinear perimeter along surface of the spindle body 102. In some embodiments, the recess 129 may have a triangular shaped upper perimeter where the end adjacent to the lower control arm mount 122 is narrower than the end adjacent to the ski mount 120 (see e.g., FIG. 6). In another configuration, recess 129 is U-shaped (see e.g., FIGS. 5E and 6). In some embodiments, the walls of the recess 129 may be angled inwards from the surface of the spindle body 102 down to the bottom of the recess 129. When viewed from the front, a rear side wall of the recess 129 may be viewable (see e.g., FIG. 8A).

In one example, the lower control arm mount 122 extends over the recess 129. In one aspect, the recess 129 reduces the weight of the spindle 100.

In at least one embodiment, the spindle body 102 further includes one or more recesses 130 (see e.g., FIGS. 4A and 5A). The recesses 130 may be positioned along the outboard side 110 of the spindle body 102. In one aspect, the one or more recesses 130 provides the spindle body 102 with an irregular outer surface. In one example, the upper portion 114 has a plurality of recesses 130 and the lower portion has a plurality of recesses 130 (see e.g., FIG. 4A). In an additional example, a plurality of recesses 130 is positioned above and/or below the flat surface 136. In one example, a first group of recesses 130 are positioned above the flat surface 136 and a second group of recesses 130 are positioned below the flat surface 136 (see e.g., FIG. 4A). In another example, the upper portion 114 has five recesses 130 positioned long the outboard side 110, the lower portion 116 has four recesses 130 positioned along the outboard side 110, and one recess 129 positioned between the lower control arm mount 122 and the ski mount 120 (see e.g., FIG. 5). The recess 130 may have any size. For example, recesses 130 located in the upper portion may be shallower and/or smaller than recesses 130 located in the bottom portion or vice-versa (see e.g., FIG. 8A). The recess 130 may have any shape. In some embodiments, the recess 130 is wedge-shaped (see e.g., FIG. 4A). In one configuration, the leading end of the wedge shape is the narrow end, and the trailing end of the wedge shape is the wide end. For example, recess 130a and recess 130b have a first end 131a with a greater depth than the second end 131b (see e.g., FIG. 4A).

The fin 128 extends backward from the spindle body 102 (see e.g., FIG. 1A). Thus, the fin 128 may be described as a rear fin. In some embodiments, the fin 128 is attached to the trailing edge 108 of the spindle body 102 (see e.g., FIGS. 3 and 6). In one aspect, the fin 128 has a length greater than its width (see e.g., FIGS. 6-7). In other words, the length of the fin 128 as it extends backward is greater than its width between the outboard and inboard sides of the fin 128. In one example, the fin 128 has a rearward extent about 3-4× greater than its side extent. In another aspect, the fin 128 extends along only a portion of the spindle body 102.

In one example the fin 128 extends from a location adjacent to a bottom of the upper control arm mount 118 to a location adjacent to a bottom end of the flat surface 136 (see e.g., FIG. 1A). In some embodiments, the fin 128 includes the tie rod mount 124. In one example, the tie rod mount 124 separates an upper portion 125 and a lower portion 127 of the fin 128 (see e.g., FIG. 1A-B). The upper portion 125 may extend inward from the tie rod mount 124 towards the upper control arm mount 118. As one non-limiting example, the upper portion 125 may be oriented at the same angle as the spindle body 102 (see e.g., line 19 of FIG. 8B). In an illustrative example, the entire upper portion 125 of the fin 128 may be shielded by the upper portion 114 of the spindle body 102 as shown in FIG. 5. The lower portion 127 may be oriented parallel to base longitudinal axis 146 or extend in an outboard direction as the lower portion 127 extends from the tie rod mount 124 towards the ski mount 120. In an illustrative example, the entire lower portion 127 of the fin 128 may be shielded by the spindle body 102 as shown in FIG. 5.

The tie rod mount 124 may be positioned between the inboard side 112 and the outboard side 110 of the spindle body 102 (see e.g., line 20 of FIG. 8B). Therefore, the spindle body 102 is positioned directly forward of the tie rod mount 124. As shown in FIGS. 2A, 5 and 6, the spindle body 102 is positioned directly forward of the tie rod mount 124 and may have a width that is wider than the width of the tie rod mount 124. In one aspect this configuration shields the tie rod mount 124 and limits direct exposure of the tie rod mount 124 to the snow.

In some implementations, the fin 128 has a V-shape. In a non-limiting example, the V-shape of the fin 128 may be similar to the V-shape of the spindle body 102. For example, when viewed from the rear, the fin 128 and the spindle body 102 have similar V-shapes with line 19 extending along the trailing edge of the upper portion 125 of the fin 128 and line 26 extending along the trailing edge of the lower portion 127 of the fin 128 (see e.g., FIG. 8B).

In some embodiments, the tie rod mount 124 extends backward from the spindle body 102 in a longitudinal direction parallel to the base longitudinal axis 146 (see e.g., FIG. 2B). In one aspect, by extending backward from a fin 128 that has a similar orientation as the spindle body 102, the tie rod mount 124 is tucked behind the spindle body 102 (see e.g., FIG. 8B). In another aspect, a majority of the spindle body 102 is positioned toward the outboard side of body 102 (see, vertical plane 144 of FIGS. 8A-B). Thus, the tie rod mount 124 is not visible when the spindle 100 is viewed from the front (see e.g., FIG. 5). When the spindle 100 is attached to a snowmobile, tucking or otherwise shielding the tie rod mount 124 behind the spindle body 102 reduces/prevents the tie rod end and/or the ball joint and fastener 154 from dragging in the snow.

In at least one embodiment, the fin 128 has at least one window 132. In one example, the fin 128 has three windows 132a, 132b, 132c (see e.g., FIG. 9A). In a further example, the fin 128 includes a window 132b positioned between the tie rod mount 124 and the spindle body 102. Each window 132 may have any suitable size and shape. In one aspect, the window 132 reduces the weight of the spindle 100 while maintaining the ability of the spindle 100 to support loads experienced during use. In one embodiment, the fin 128 has a reduced thickness area or recess instead of a window 132 (not shown).

In some embodiments, a support member 134 separates adjacent windows (see e.g., FIG. 4A). In one example, the support member 134 is V-shaped with a window 132 positioned inside the V (see e.g., line 1 and line 2 of FIG. 1B). The V-shape may be made by a single support member 134 or two support members 134. When viewed from the side, the upper portion 125 and/or lower portion 127 of the fin 128 may also be oriented at an angle to support member 134 to form a V-shape (see e.g. lines 22 and 24 of FIG. 1B). The fin 128 may be described as having an upper triangular shaped portion defined by the upper portion 125, support member 134 and the spindle body 102 (see e.g. triangle defined by lines 1, 22, and 23); a middle triangular shaped portion defined by support member 134 and the spindle body 102 (see e.g., triangle defined by lines 1, 2, and 23), and a lower triangular shaped portion defined by the lower portion 127, support member 134 and the spindle body 102 (see e.g., triangle defined by lines 2, 23, and 24).

In at least one embodiment, a steering axis 140 extends through the upper control arm mount 118, the lower control arm mount 122, and the ski mount 120 (see e.g., FIG. 7). In this exemplary configuration, the bulk of the spindle material (majority of the spindle body 102) is positioned behind the steering axis 140. The steering axis 140 may form a part of the vertical plane 144 (see e.g., FIGS. 8A-B).

In additional embodiments, the upper control arm mount 118, lower control arm mount 122, and ski mount 120 are aligned along a vertical plane 144 and the tie rod mount 124 is positioned outboard of the vertical plane 144. In this example, the vertical plane 144 is positioned inboard relative to the vertical plane 146 (see e.g., FIGS. 8A-B). In these embodiments, the tie rod mount 124 is positioned closer to the outboard side than the upper control arm mount 118, lower control arm mount 122, and the ski mount 120. In one example, the tie rod mount 124 extends rearward, parallel to the vertical plane 146 (see also FIGS. 2B and 3).

In some embodiments, when viewed from above, the upper control arm mount 118 is positioned between the lower control arm mount 122 and the tie rod mount 124 (see e.g., FIG. 2B). The upper control arm mount 118 may be positioned inboard to the base longitudinal axis 146. In one example, the upper control arm mount 118 lies on a vertical plane 144 that is parallel to the vertical plane 146 that includes the longitudinal axis of the base 119 (see also FIG. 8A). In one example, the upper control arm mount 118 is closer in a longitudinal direction to the tie rod mount 124 than to the lower control arm mount 122, and the lower control arm mount 122 is closer in a longitudinal direction to the ski mount 120 than to the upper control arm mount 118 (see e.g., FIGS. 1B-C). In some embodiments, when viewed from the side, the tie rod mount 124 is positioned in a vertical direction between the upper control arm mount 118 and the lower control arm mount 122, and the lower control arm mount 122 is positioned in a vertical direction between the tie rod mount 124 and the ski mount 120 (see e.g., FIGS. 1A and 5). In one example, at least a portion of each mount 118, 120, 122, 124 is viewable when the spindle 100 is viewed toward the inboard and outboard directions (see e.g., FIGS. 1A and 5).

Figure 9A:
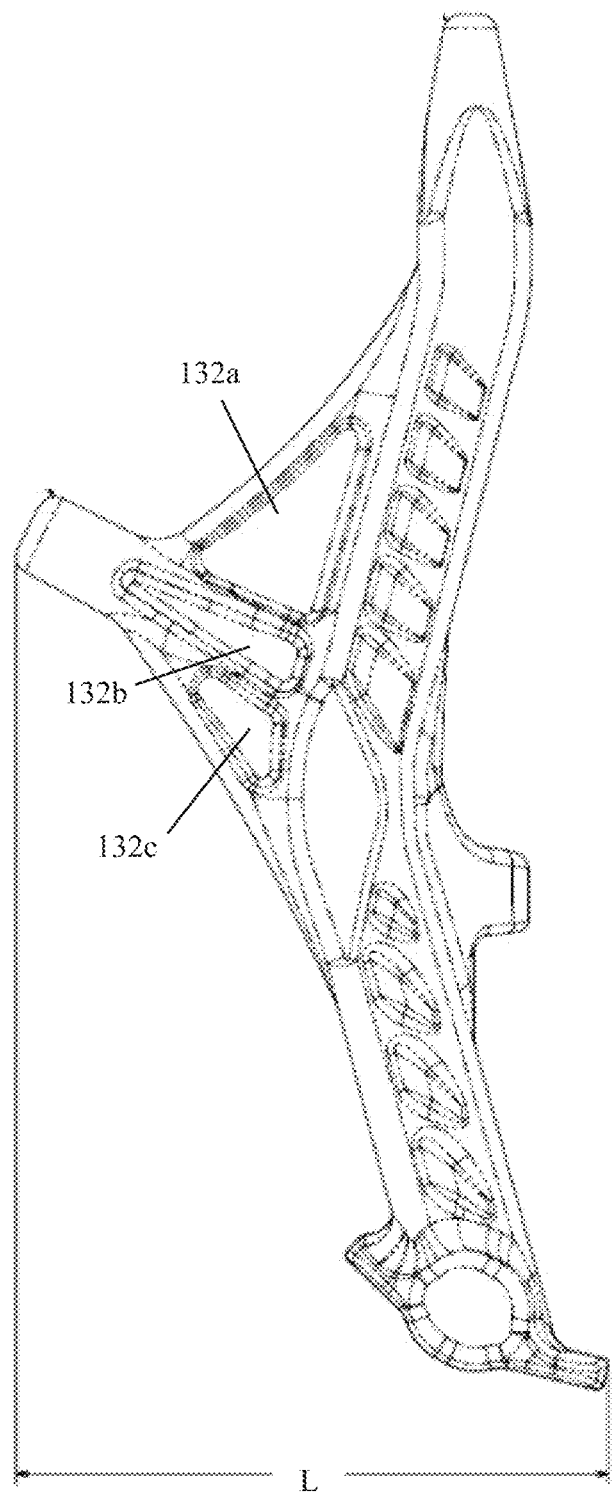
FIG. 9A is a side view of the spindle, according to some embodiments of this disclosure.
Figure 9B:
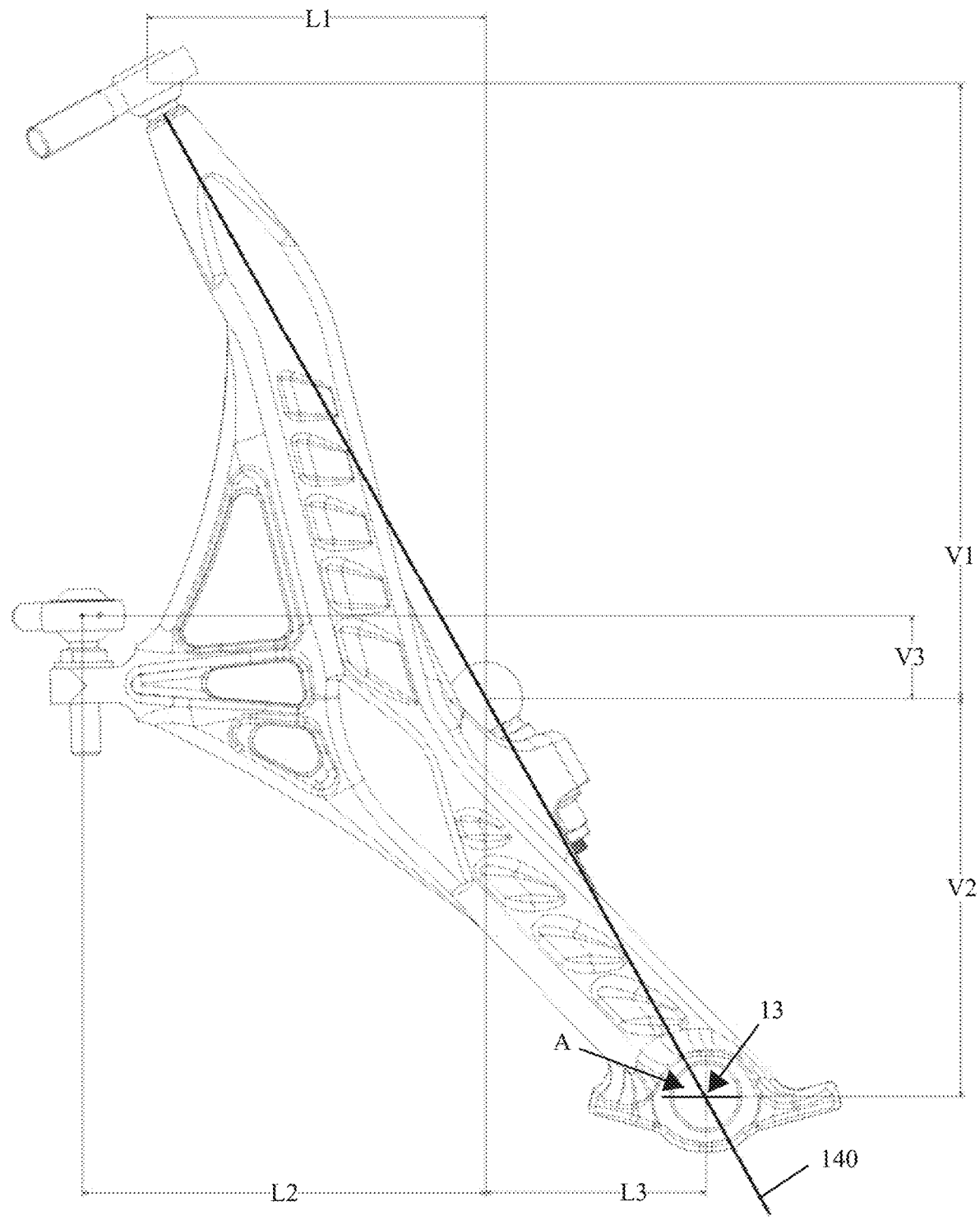
FIG. 9B is a side view of the spindle, according to some embodiments of this disclosure.
Figure 9C:
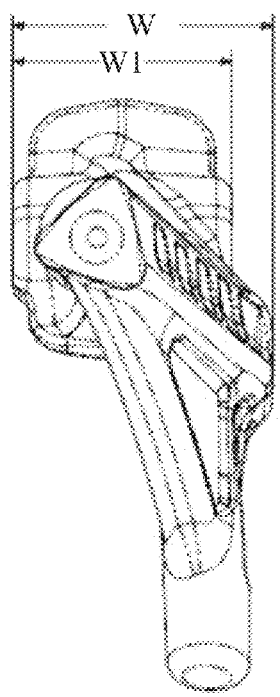
FIG. 9C is a top view of the spindle, according to some embodiments of this disclosure.
Figure 10A:
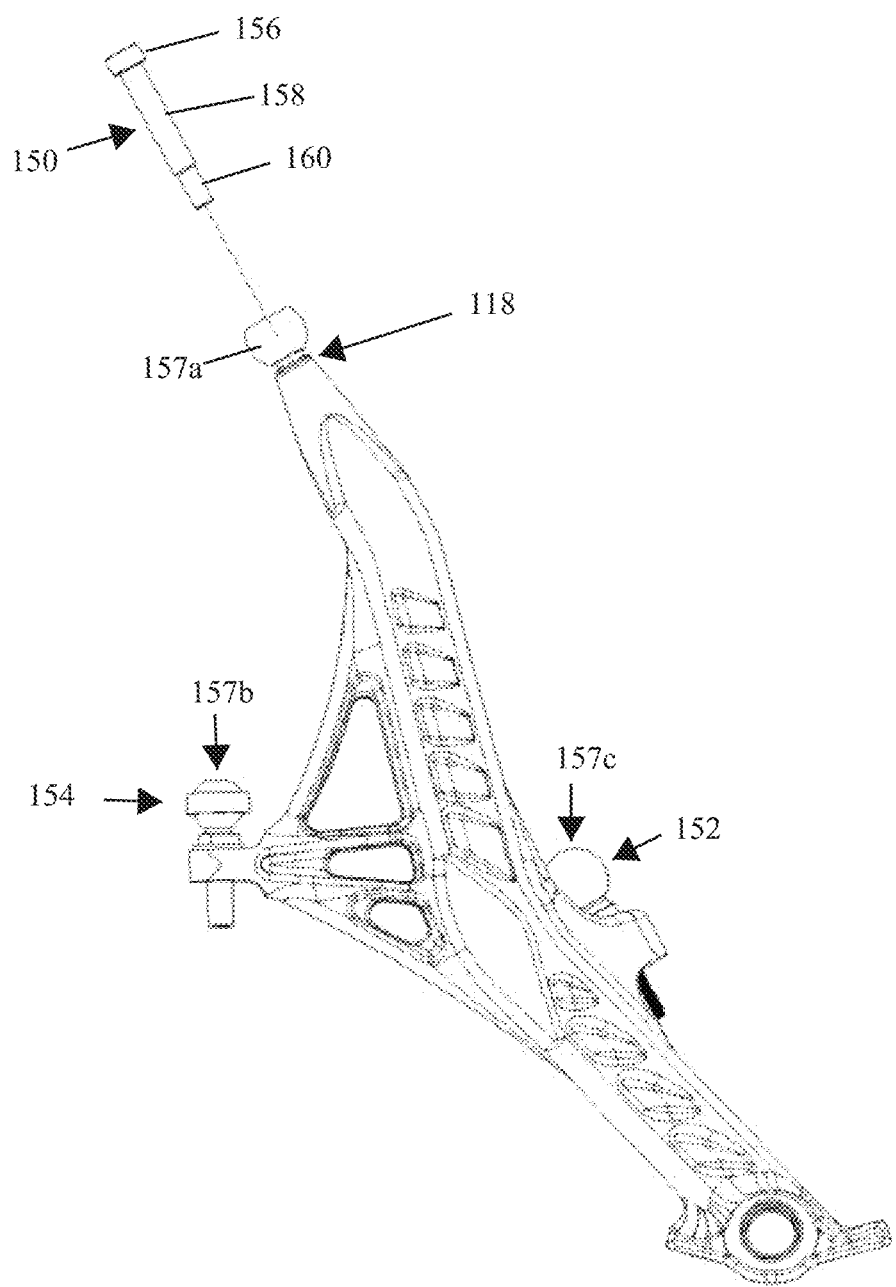
FIG. 10A is an outboard side view of the spindle showing the fastener to be inserted into the upper control arm mount, according to some embodiments of this disclosure.
Figure 10B:
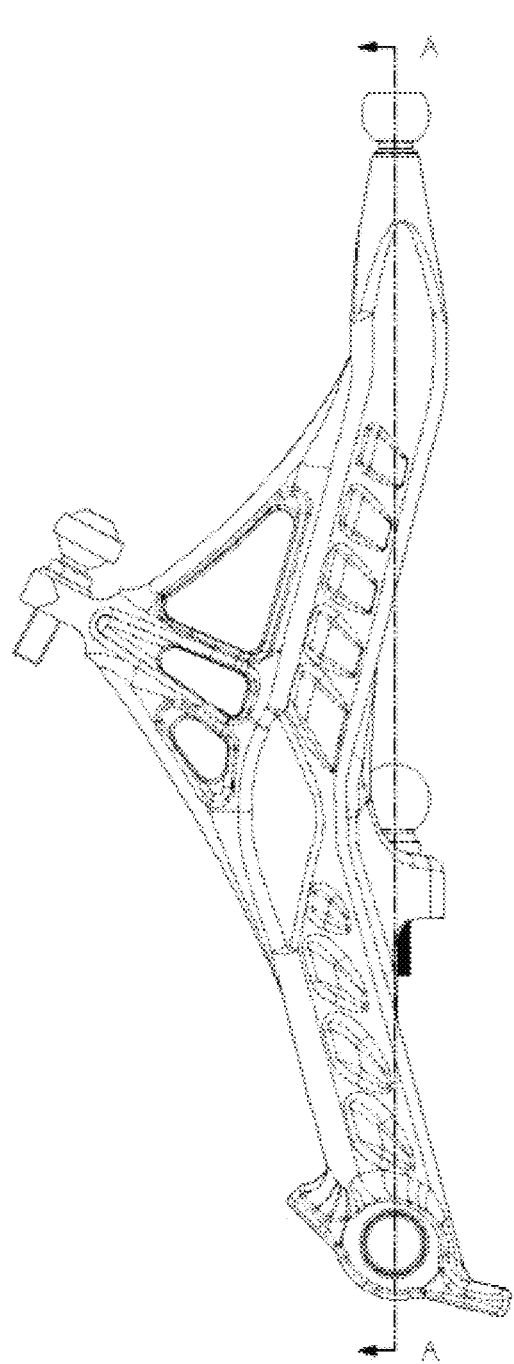
FIG. 10B is a side view of the spindle with the fastener inserted into the upper control arm mount, according to some embodiments of this disclosure.
Figure 10C:
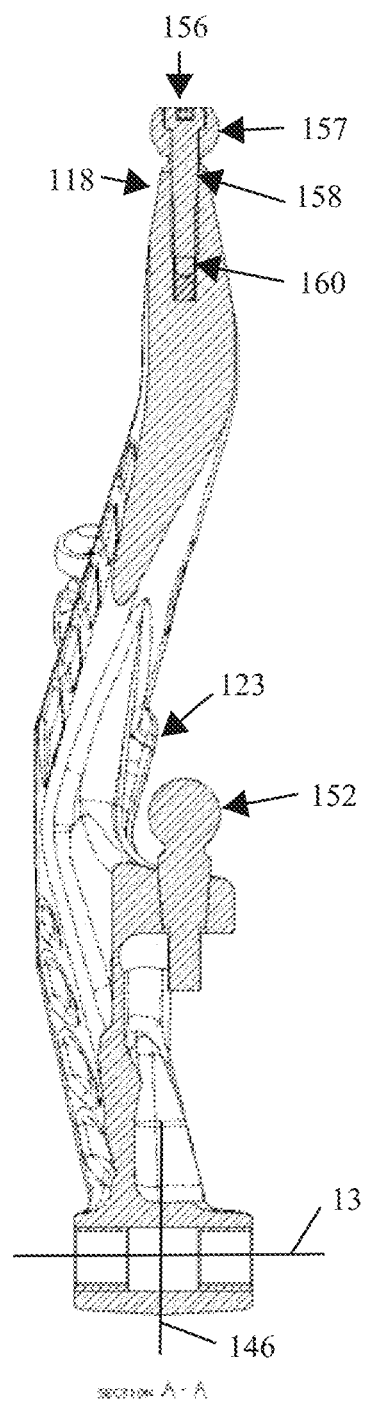
FIG. 10C is a cross-sectional view of the spindle with the fastener inserted into the upper control arm mount taken at line A-A, according to some embodiments of this disclosure.
Figure 11A:
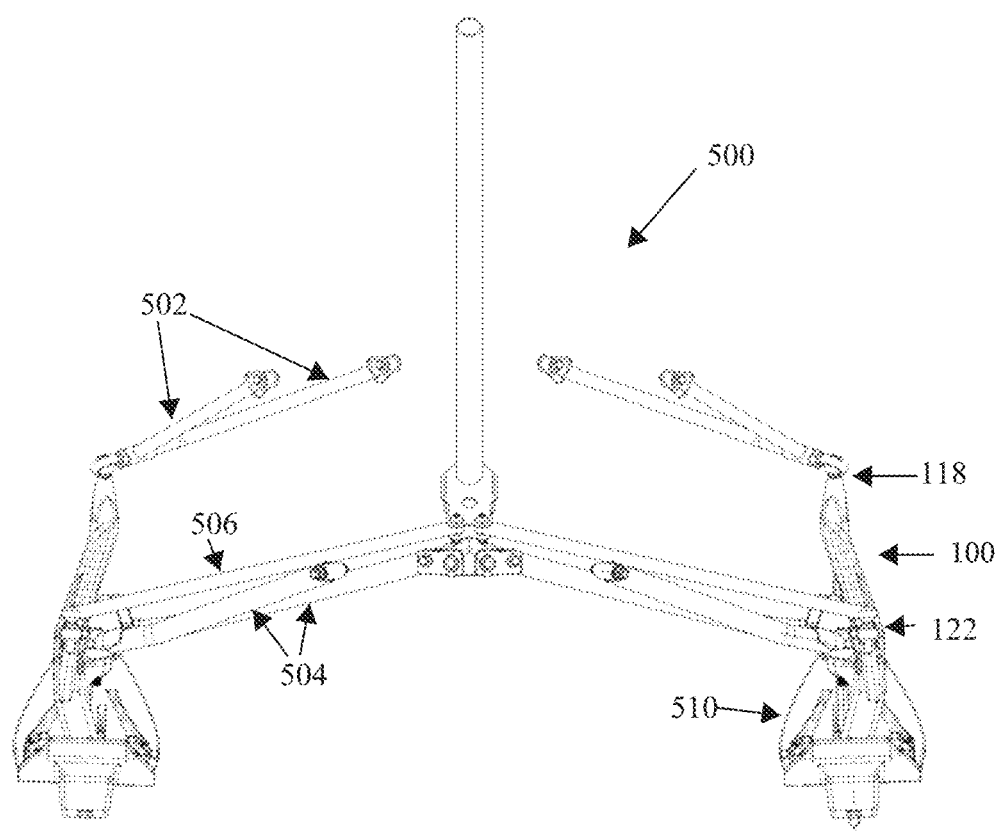
FIG. 11A is a rear view of the suspension system, according to some embodiments of this disclosure.
Figure 11B:
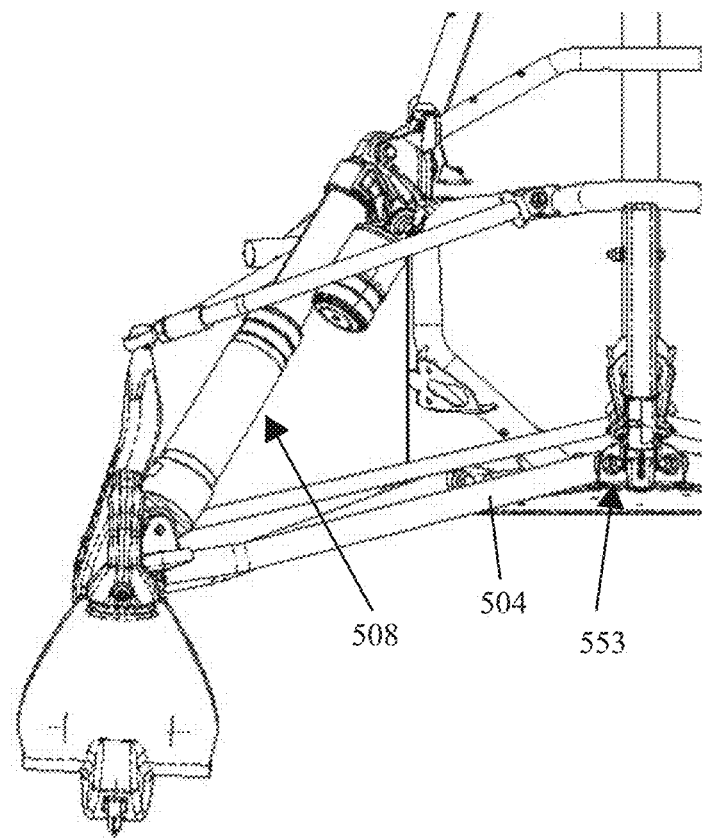
FIG. 11B is a front view of a portion of the suspension system, according to some embodiments of this disclosure.

FIGS. 9A-C identifies lengths L, V, W of the spindle 100 and an angle A. In this illustrative example, the upper control arm mount 118, the lower control arm mount 122, and the tie rod mount 124 each form a part of a ball joint, as discussed below in greater detail (see FIGS. 10A-C). Although many of the lengths L1-L3 and V1-V3 are measured from the center of the ball 157 of one ball joint to the center of the ball 157 of another ball joint, for simplicity, reference will be made to the mounts 118/122/124. Angle A is the angle of the steering axis 140 to the line indicating the lower bound of V2, at the long axis 13 of the ski mount 120 when the suspension is in a fully extended state and the skis are directed forward. In one example, angle A is about 25° to 35°. In FIG. 9A, the spindle 100 is tilted to an upright position where an axis through the upper control arm mount 118 is perpendicular to the ground. In this orientation, the spindle 100 has a length L extending from a trailing edge of the rear tie rod mount 124 to a leading edge of the base 119 that includes the ski mount 120. In FIG. 9B. the spindle 100 has the same angle as it would be when attached to a front suspension when the suspension is in a fully extended state and the skids are directed forward (see e.g., FIG. 12D). In this orientation, lengths L1, L2, L3, V1, V2, and V3 are identified. FIG. 9C is a top view of the spindle 100 with widths W and W1 identified.

As shown in FIG. 9B, L1 represents the length between the upper control arm mount 118 and the lower control arm mount 122, L2 represents the length between the tie rod mount 124 and the lower control arm mount 122, L3 represents the length between the lower control arm mount 122 and the ski mount 120, L1+L3 represents the length between the upper control arm mount 118 and the ski mount 120, and L2+L3 represents the length between the tie rod mount 124 and the ski mount 120. In some embodiments, the length from the tie rod mount 124 to the upper control arm mount 118 is less than the length from the lower control arm mount 122 to the ski mount 120, which is less than the length from the upper control arm mount 118 to the lower control arm mount 122 ((L2−L1)<L3<L1)). In some embodiments, the longitudinal length of the spindle 100 in the upright position is less than the longitudinal length in its use orientation. In one example, the longitudinal length in the its use orientation is about 17% greater than its length in the upright position. Length L2+L3, from the rear tie rod mount 124 to the ski mount 120, may be described as a total length. In one example, L1 comprises about 50% to 60% of the total length and optionally 53% to 57% of the total length, L2 comprises about 60% to 70% of the total length and optionally 63% to 67% of the total length, L3 comprises 30% to 40% of the total length and optionally a 33% to 37% of the total length, L1+L3 comprises 85% to 95% of the total length and optionally 87% to 93% of the total length, and L2−L1 comprises 5% to 15% of the total length and optionally 7% to 13% of the total length.

In at least one embodiment, the lower control arm mount 122 is closer to the ski mount 120 along the steering axis 140 than to the upper control arm mount 118 (see e.g., FIG. 9B). In one example, the length between the lower control arm mount 122 and the ski mount 120 along the steering axis 140 is 35% to 45% of the length and optionally 37% to 43% of the length between the upper control arm mount 118 and the ski mount 120 along the steering axis 140.

As shown in FIG. 9B, V1 represents the vertical height between the upper control arm mount 118 and the lower control arm mount 122, V2 represents the vertical height between the lower A-arm mount 122 and the long axis 13 of the ski mount 120, V3 represents the vertical height between the tie rod mount 124 and the lower control arm mount 122, and V1+V2 represents the vertical height between the upper control arm mount 118 and the long axis 13 of the ski mount 120. In some embodiments, the vertical length from the tie rod mount 124 to the lower control arm mount 122 is less than the vertical length from the lower control arm mount 122 to the ski mount 120, which is less than the vertical length from the upper control arm mount 118 to the tie rod mount 124 (V3<V2<(V1−V3)) (see e.g., FIG. 9B). Height V1+V2, measured from the upper control arm mount 118 to the ski mount 120, may be described as a total vertical length. In one example, V1 comprises 55% to 65% of the total vertical length and optionally 57% to 63% of the total vertical length, V2 comprises 35% to 45% of the total vertical length and optionally 37% to 43% of the total vertical length, V3 comprises 5% to 10% of the total vertical length, and V1-V3 comprises 50% to 55% of the total vertical length.

As shown in FIG. 9C, W represents the width of the spindle 100 measured from an inboard edge of the ski mount 120 to the flat surface 136 of the outboard edge, and W1 represents the width of the ski mount 120 measured from the inboard edge to the outboard edge. In some embodiments, the width of the spindle 100 is greater than the width of the ski mount 120 (W1<W). In one example, W1 is 10% to 20% smaller than W and optionally about 13% to 17% smaller than W.

The spindle 100 may be made of any suitable material, including, but not limited to, lightweight metals and alloys. Illustrative examples include aluminum and aluminum alloys, titanium and titanium alloys, and magnesium and magnesium alloys. In a non-limiting example, the spindle 100 may be comprised of 6061 aluminum and may be forged. It is to be understood that the spindle 100 is not limited to forgings as other methods including, but not limited to, casting, additive manufacturing, and machining may be used to fabricate the spindle 100.

In at least one embodiment, an intermediate form 101 of the spindle 100 includes a body 113 with a base 115 where the body 113 has a triangular cross-sectional shape extending uninterrupted from the base 115 to the upper end of the body 113 (see e.g., FIG. 5F). Lines 10, 11, and 12 extend along a leading edge of the intermediate form 101. The intermediate form 101 may further include an upper integral component (not shown) and a lower integral component 117. In some embodiments, the intermediate form 101 is a casting, but may also be forged, additive manufactured, or machined from billet. The body 113 of the intermediate form 101 may have a V-shape, may vary in volume, and/or may have a leading edge with an orientation that rotates, as discussed above for the spindle body 102. Machining may be utilized to form the ski mount 120 in the base 115, the upper control arm mount 118 in the upper integral component, the lower control arm mount 122 in the integral lower integral component 117, the flat surface 136, recess 129, and/or one or more recesses 130. Although described herein as an intermediate form 101, it is to be understood that the intermediate form 101 may be secured to one or more skis and a suspension and/or frame and used as a finished spindle.

As shown in FIGS. 1A and 2A, the upper control arm mount 118, ski mount 120, lower control arm mount 122, and/or the tie rod mount 124 define a hole 126 for attaching the spindle 100 to a ski 510 and a suspension and/or frame. The mount hole 126 may be a through hole or a blind hole. The mount holes 126 for the upper control arm mount 118, lower control arm mount 122, and tie rod mount 124 are configured to receive a fastener 150, 152, 154. Optionally, one or more of the fasteners 150, 152 and 154 are removably secured to the spindle 100. In some embodiments, the upper control arm mount hole 126 is a blind hole, and the lower control arm and tie rod mount holes 126 are through holes (see e.g., FIGS. 10A-C). The upper control arm mount hole 126 may define a threaded chamber configured to removably secure the fastener 150 to the upper control arm mount 118. The chamber may include only a single opening for receiving the fastener, rather than a channel or tunnel through the body that is open at both ends. In some embodiments, the upper control arm mount hole 126 may be threaded by using a thread forming technique, whereby the threads are roll-formed. Such thread forming may densify and/or harden the threads and inner surface of the mount hole 126, providing a strong connection point. In other embodiments, the upper control arm mount hole 126 may be threaded via a cutting thread. The mount hole 126 for the upper control arm mount 118 may be 30-50% of the volume of the upper control arm mount 118—in other words 30-50% of the upper control arm mount 118 is hollow. In at least one embodiment, the fastener 150, 152, 154 has a head 156 and a body. In some embodiments, the fastener body includes a first body portion 158, and a second body portion 160. The first and second body portions 158, 160 may have the same diameter or different diameters. In one example, the first body portion 158 has a greater diameter than the second body portion 160 (see e.g., FIG. 10A). In another example, the fastener body tapers. In at least one embodiment, the first body portion 158 and/or second body portion 160 is threaded to mate with a threaded section of the mount wall (see e.g., FIGS. 10B-C). In another example, the fastener 150, 152, 154 is press-fitted into the mount hole 126. In another example, the lower portion of the fasteners 152 and 154 may be threaded and removably secured to the tie rod mount 124 and the lower control arm mount 122 with a threaded nut (not shown). In some embodiments, the upper control arm mount 118, the lower control arm mount 122, and the tie rod mount 124 each form a part of a ball joint. In some embodiments, the head 156 is positioned within a ball 157, as illustrated for example, by fastener 150 (see e.g., FIGS. 10A and 10C). In other embodiments, the head 156 is a ball 157, as illustrated for example, by fastener 152.

In addition to a fastener 150, 152, 154, the coupling of the spindle 100 to the front suspension 500 may further include a coupling housing or knuckle 507. FIG. 15A illustrates an example of an attachment assembly that may be utilized to couple the front suspension to the lower control arm mount 122. The attachment assembly includes a knuckle 507 and a fastener 152. In this example, the knuckle 507 includes a first portion 509 and a second portion 511. The first portion 509 extends around a portion of a lower control arm 504. The second portion 511 is positioned above the lower control arm mount 122 and extends at least partially around the shock 508.

FIGS. 11-13D include a perspective rear view, a front view, side views, and top views showing the attachment of two spindles 100 to a forward frame 540 of a snowmobile, according to some embodiments. The forward frame 540 may be a common forward frame—i.e. a frame that may be used for different snowmobiles. A steering column 512 may be coupled to the forward frame 540 by a steering column mount 520 that extends along the longitudinal axis 21 of the snowmobile. The steering column 512 includes a handle 542. In some embodiments, the steering column 512 extends along line 25 and includes a second end operably connected to the forward frame 540 forward of at least a portion of the spindle 100 (see FIG. 12A). In one example, the steering column 512 extends entirely over the top of the spindle 100 when viewed from the side of the forward frame 540 when the suspension is in a fully extended state and the skis are directed forward. In a non-limiting example, when viewed from the side of the forward frame 540 the second end of the steering column 512 is operably connected to the forward frame 540 at or forward of the lower control arm mount 122 when the suspension is in a fully extended state and the skis are directed forward.

In some embodiments, two spindles 100 are attached to the front suspension 500. In these embodiments, the two spindles 100 are mirror images (see e.g., FIG. 11). The exemplary forward frame 540 may be coupled to a front suspension 500.

The front suspension 500 includes upper control arms 502 (e.g., A-arms), lower control arms 504 (e.g., A-arms), steering tie arms/rods 506, shock absorbers 508, and skis 510. In some embodiments, the front suspension 500 is connected to the chassis by at least one bracket or fastener 550 (see e.g., FIG. 12A). For example, the lower control arm 504 may be coupled to the forward frame 540 by a first bracket or casting 552 and by a second bracket or casting 553 (see e.g., FIGS. 11B and 12A).

The spindle is connected to the upper control arm 502 by the upper control arm mount 118, to the lower A-arm 504 by the lower control arm mount 122, to the steering tie rod/arm 506 by the tie rod mount 124, and to the ski 510 by the ski mount 120. A shock absorber 508 is also connected to the lower control arm mount 122 and/or lower A-arm 504 (see e.g., FIG. 11B).

Figure 12A:
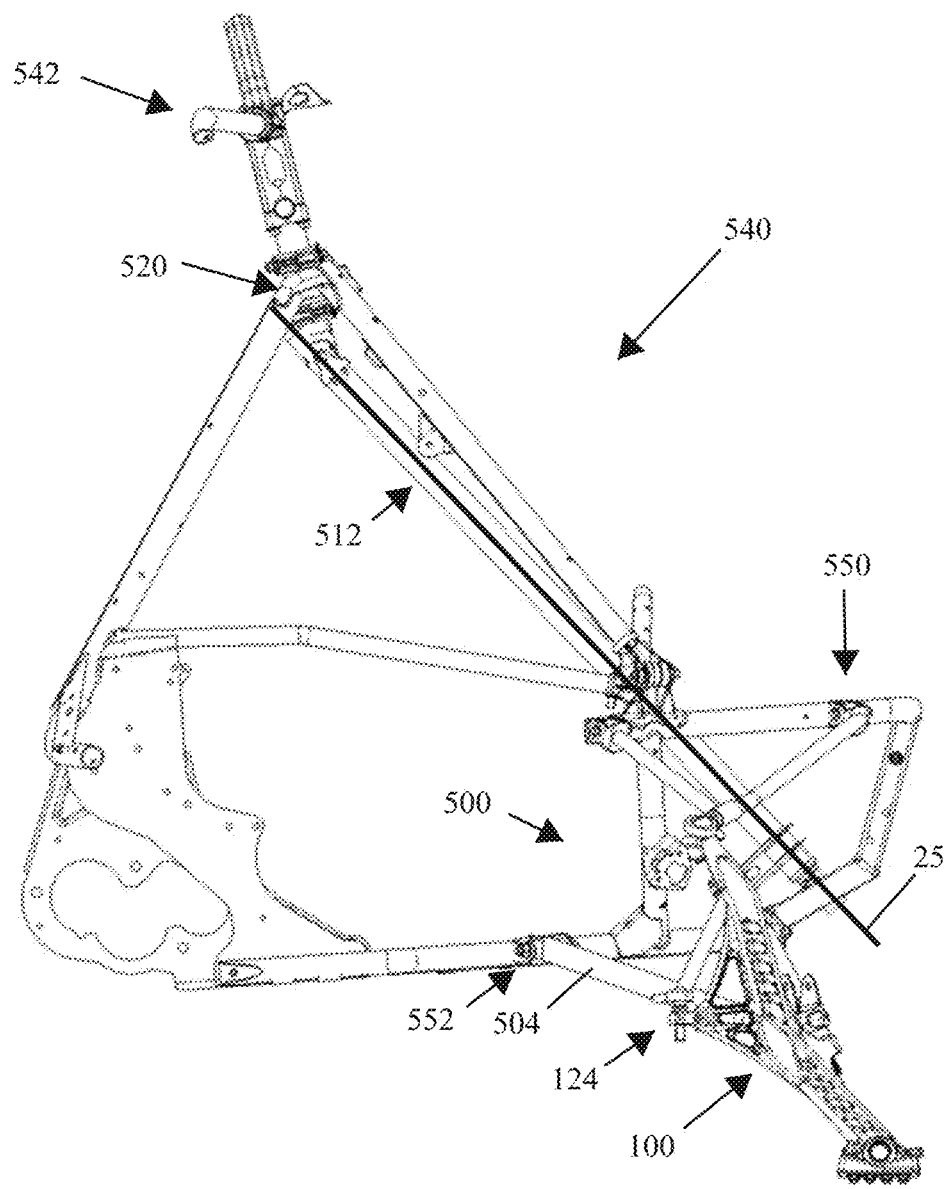
FIG. 12A is a side view of the spindle attached to a frame, according to some embodiments.
Figure 12B:
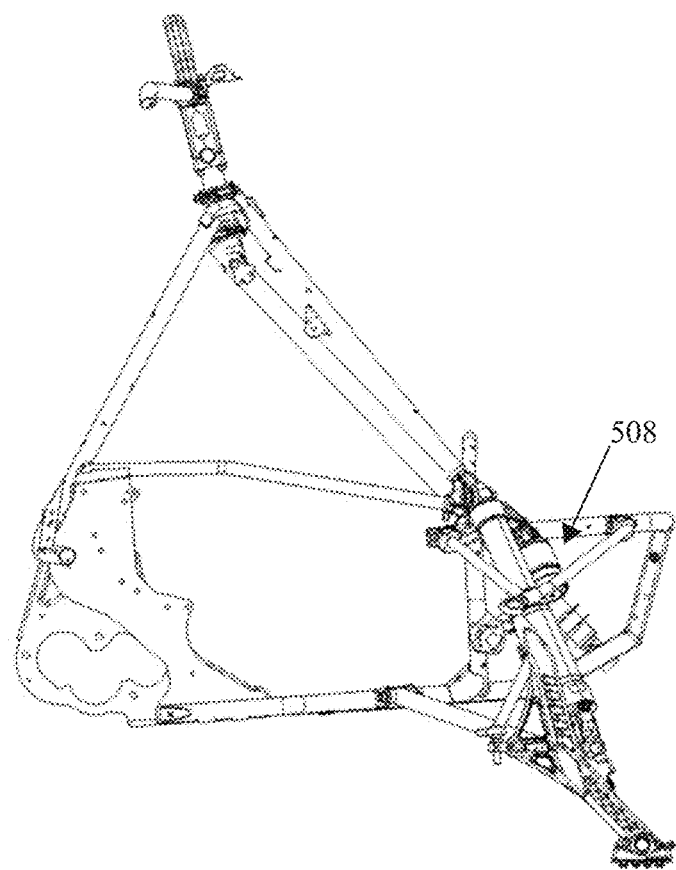
FIG. 12B is a side view of the spindle attached to a frame, according to some embodiments.
Figure 12C:
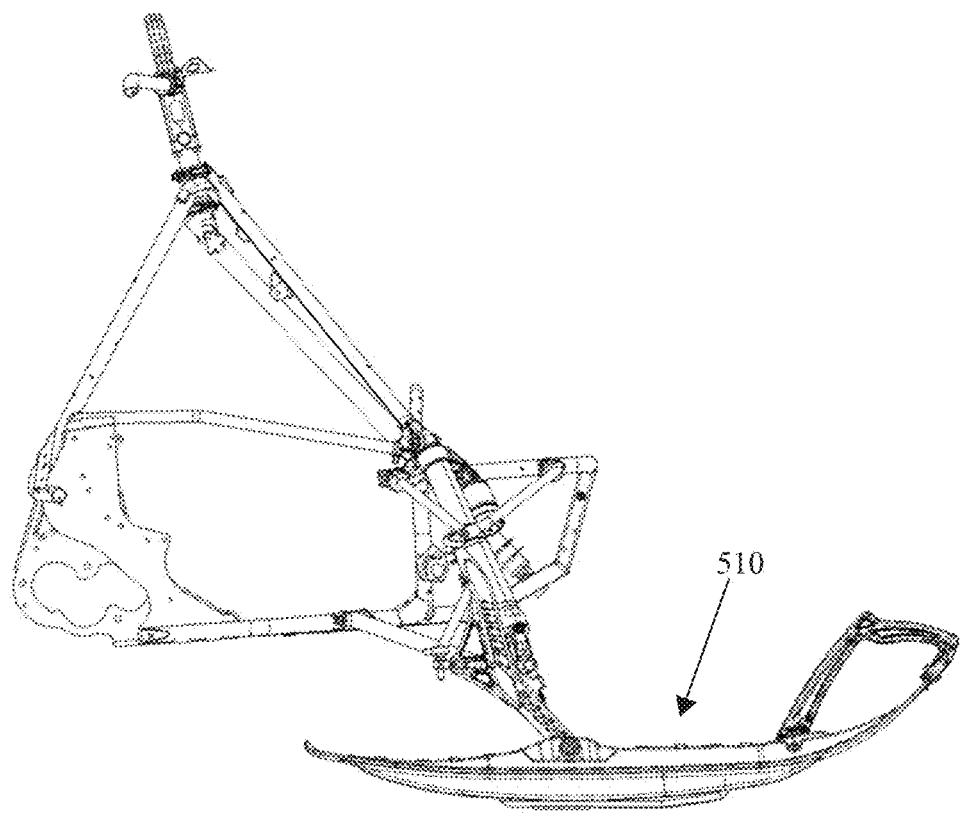
FIG. 12C is a side view of the spindle attached to a frame, according to some embodiments.
Figure 12D:
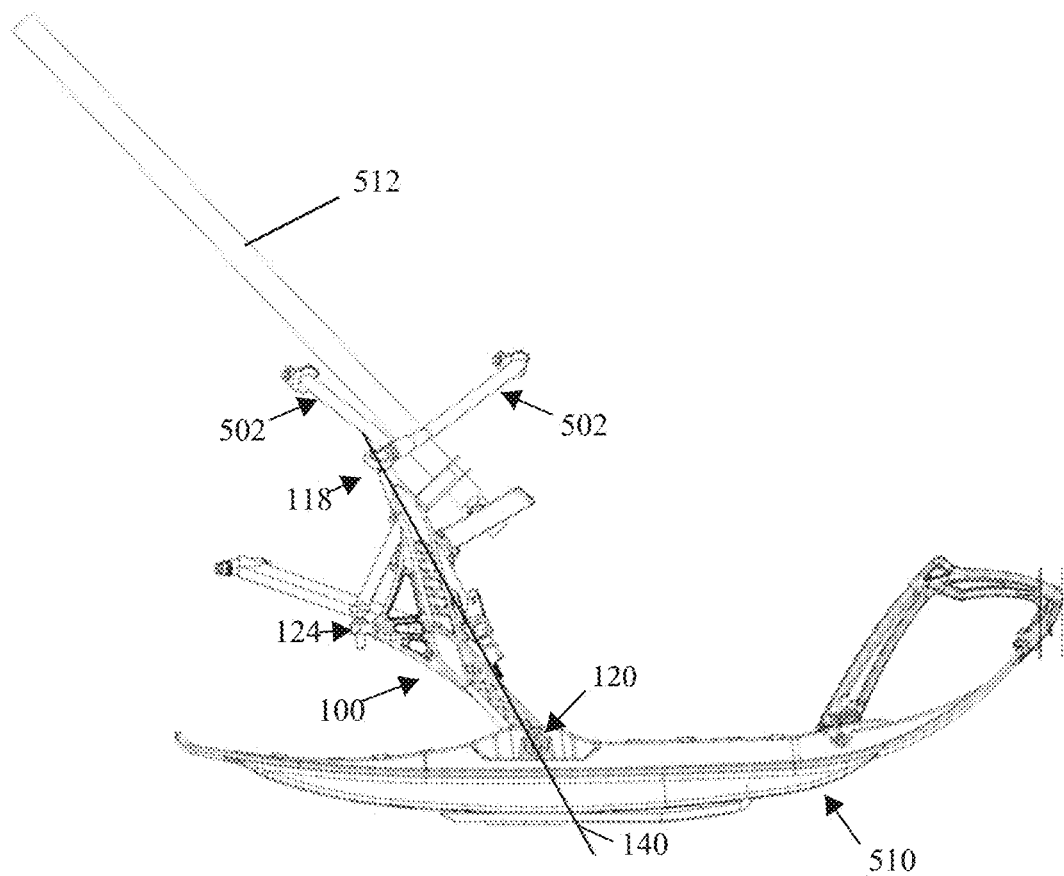
FIG. 12D is a side view of the spindle attached to a frame, according to some embodiments.
Figure 13A:
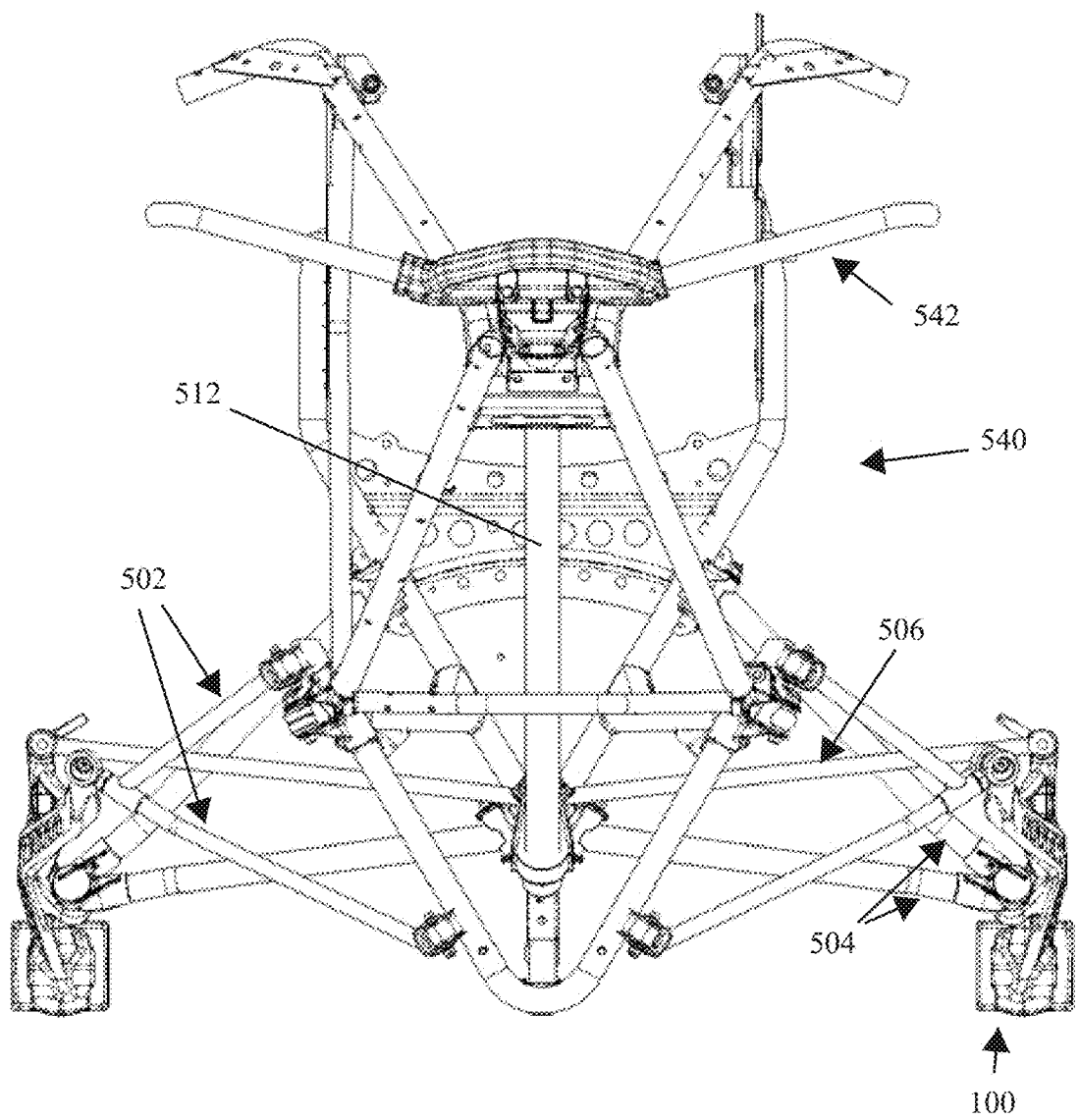
FIG. 13A is a front view of the frame without a shock or a ski, according to some embodiments.
Figure 13B:
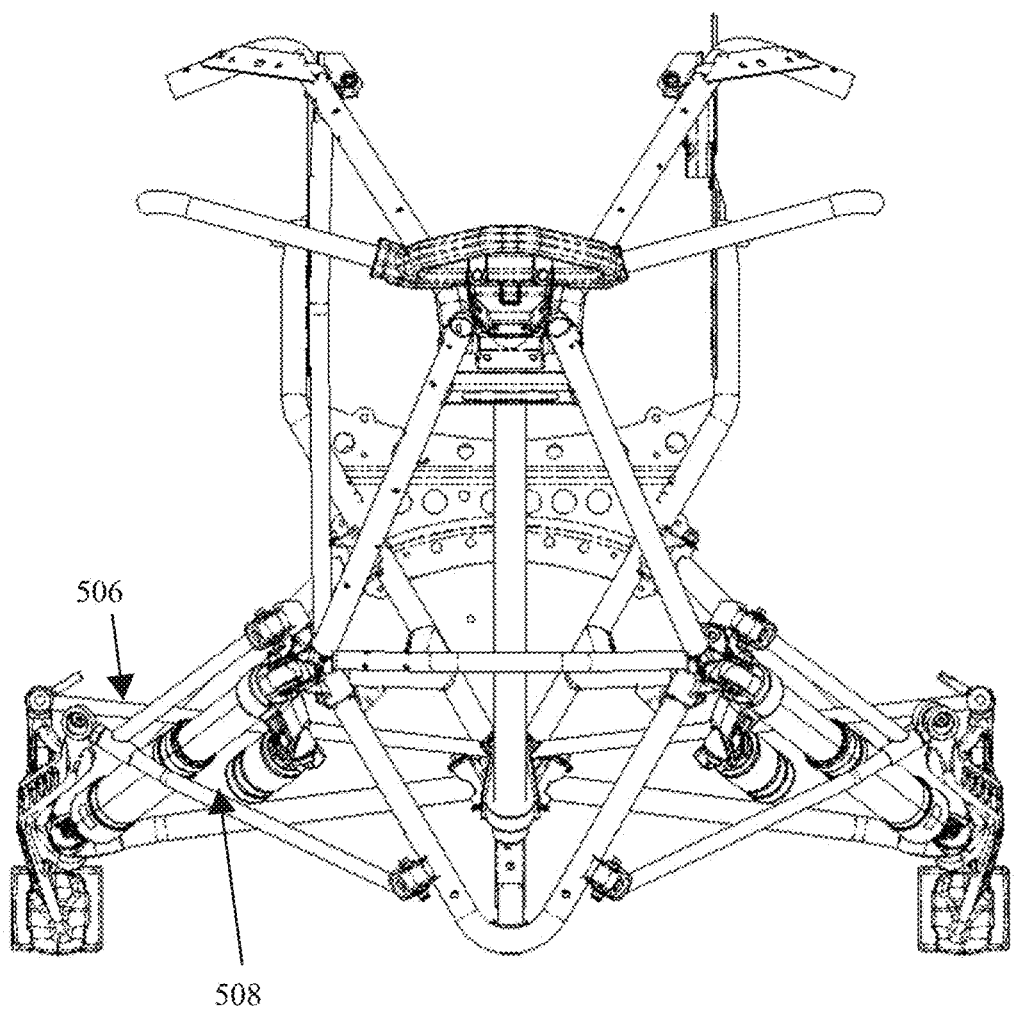
FIG. 13B is a front view of the frame including the shock, according to some embodiments.
Figure 13C:
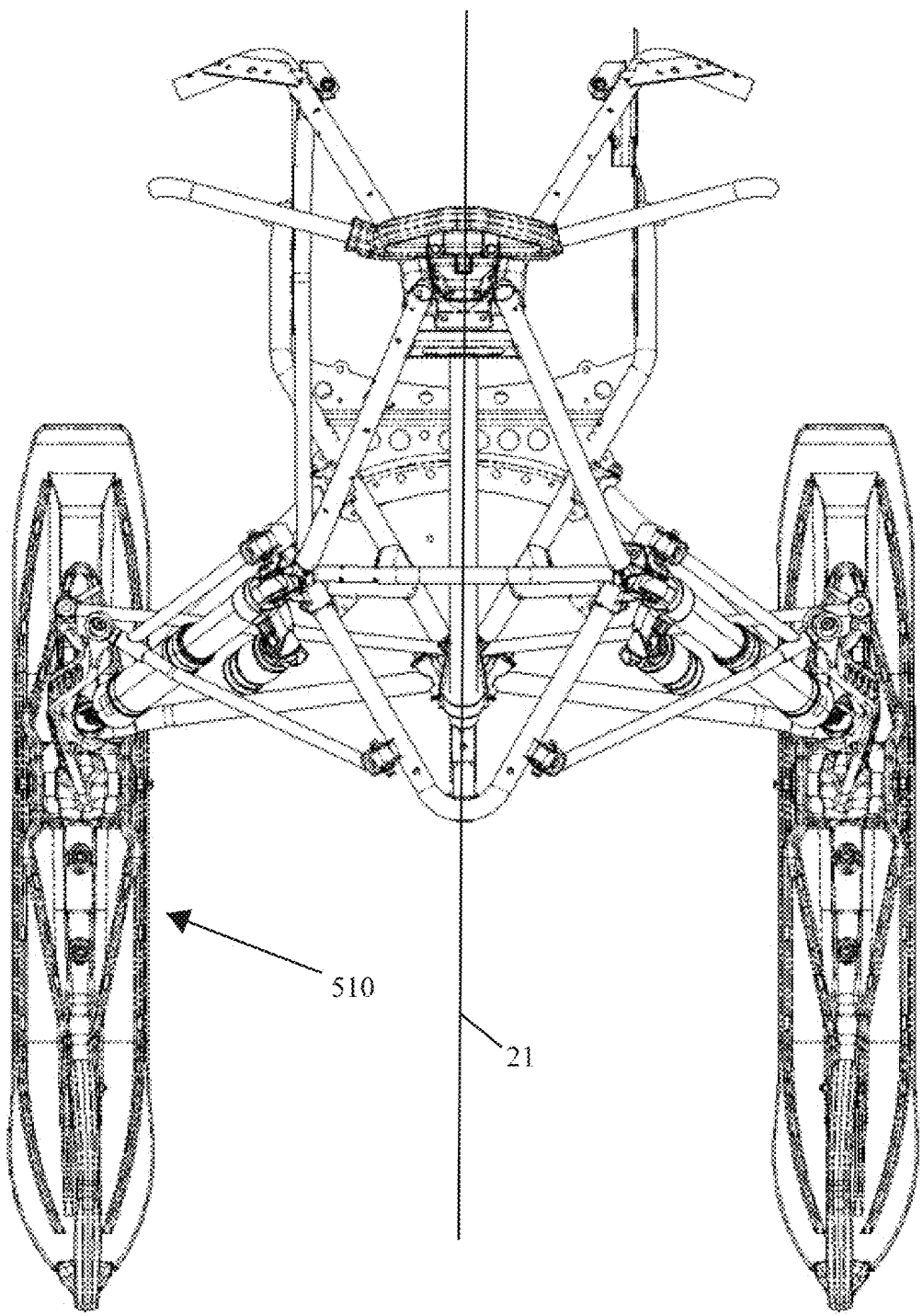
FIG. 13C is a top view of the frame including the ski, according to some embodiments.
Figure 13D:
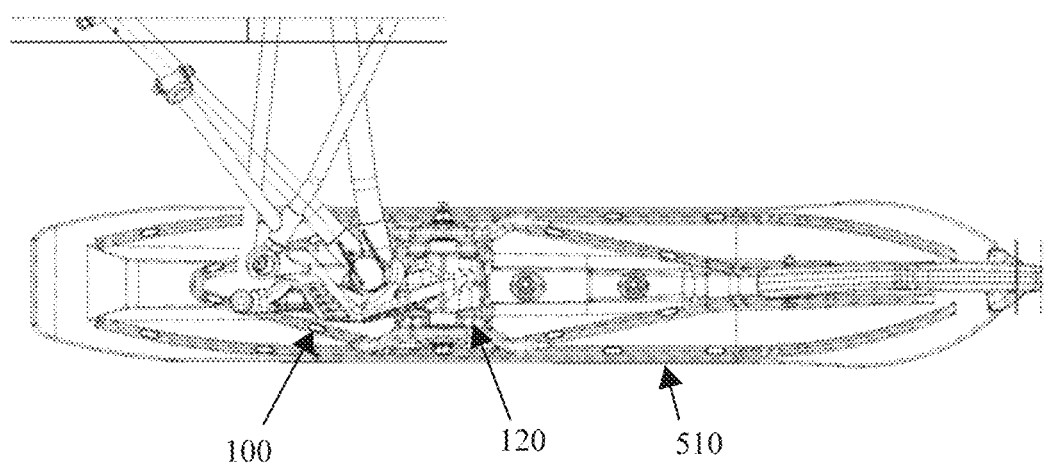
FIG. 13D is a top view of the ski, according to some embodiments.

When the spindle 100 is attached to the ski 510, the spindle 100 is oriented so that the bottom mount hole 126 is perpendicular to the long axis of the ski 510 (see e.g., FIGS. 12B-C). In other words, the base longitudinal axis 146 of the base 119 is parallel to the long axis of the ski 510 and the long axis 13 of the ski mount 120 is perpendicular to the long axis of the ski 510. In one aspect, a majority of the front suspension is positioned behind the ski mount 120 (see e.g., FIG. 12D), when, for example, the suspension is in a fully extended state and the skis are directed forward. In some embodiments, windows 132 defined by the fin 128 are oriented substantially parallel to the long axis of the ski 510. The window 132 may also be described as being oriented generally perpendicular to base longitudinal axis 146. In other words, the window 132 is oriented perpendicular to a direction of forward travel so that a line through the window is perpendicular to the long axis of the ski 510 (see e.g., FIG. 12C where a line through a window would go into the page). In other embodiments, the steering axis 140 is at an oblique angle to the ski 510 (see e.g., FIG. 12D). In one example, the oblique angle is in the range of 25° to 35° and optionally 27° to 37°.

Figure 16A:
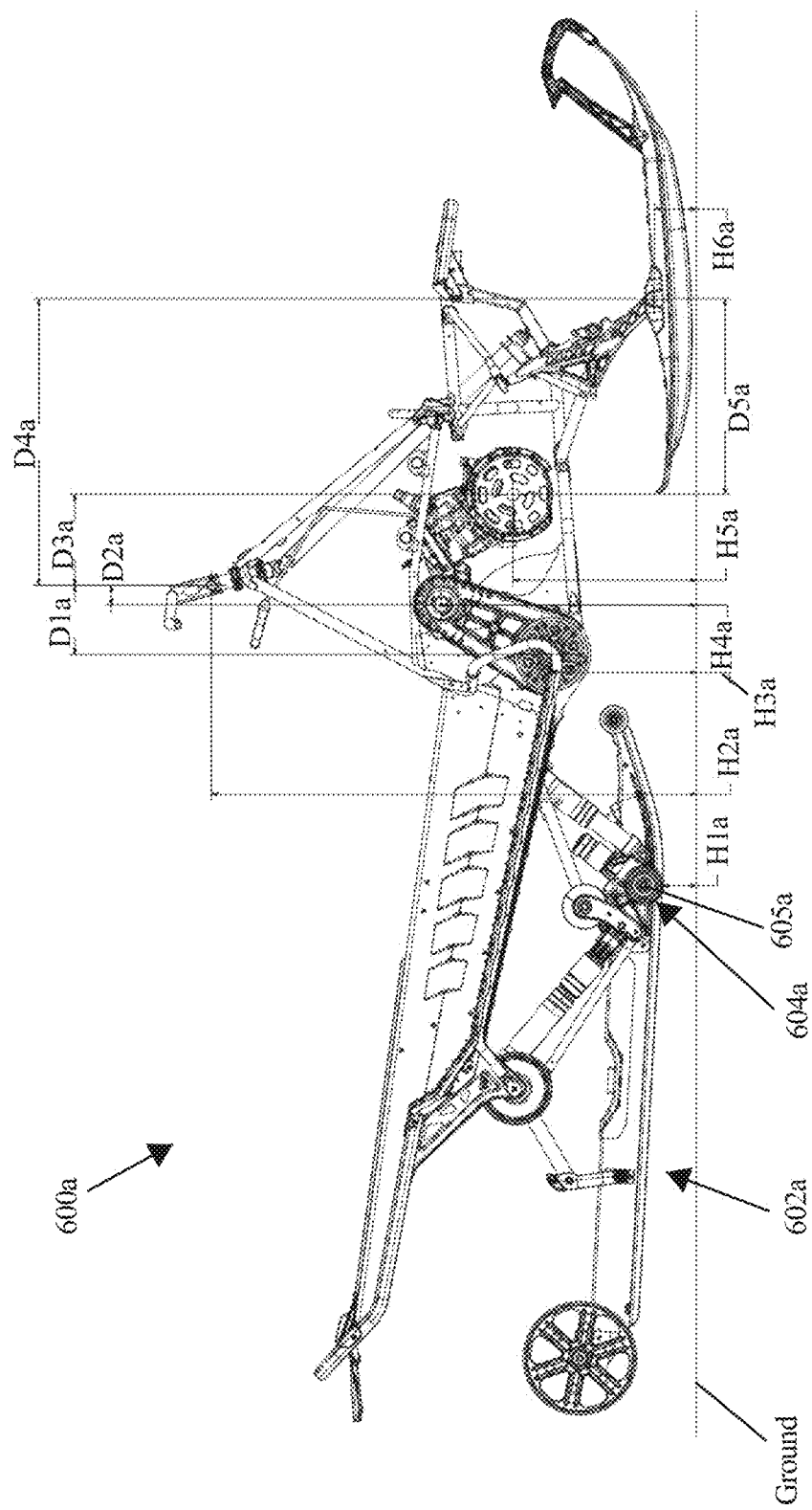
FIG. 16A is a side view of the snowmobile with the track removed, according to some embodiments.
Figure 16B:
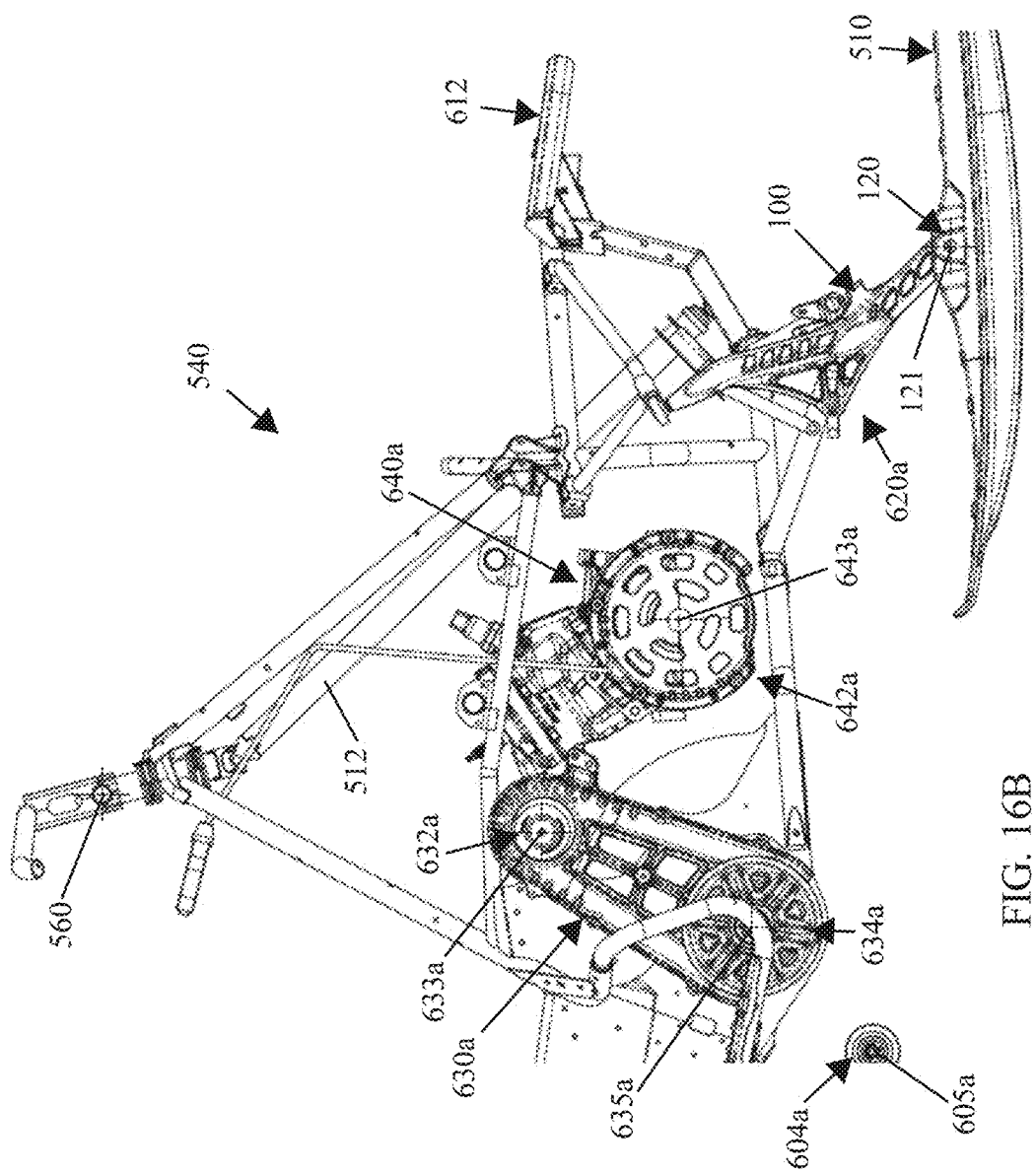
FIG. 16B is an enlarged view of a portion of the snowmobile, according to some embodiments.
Figure 17A:
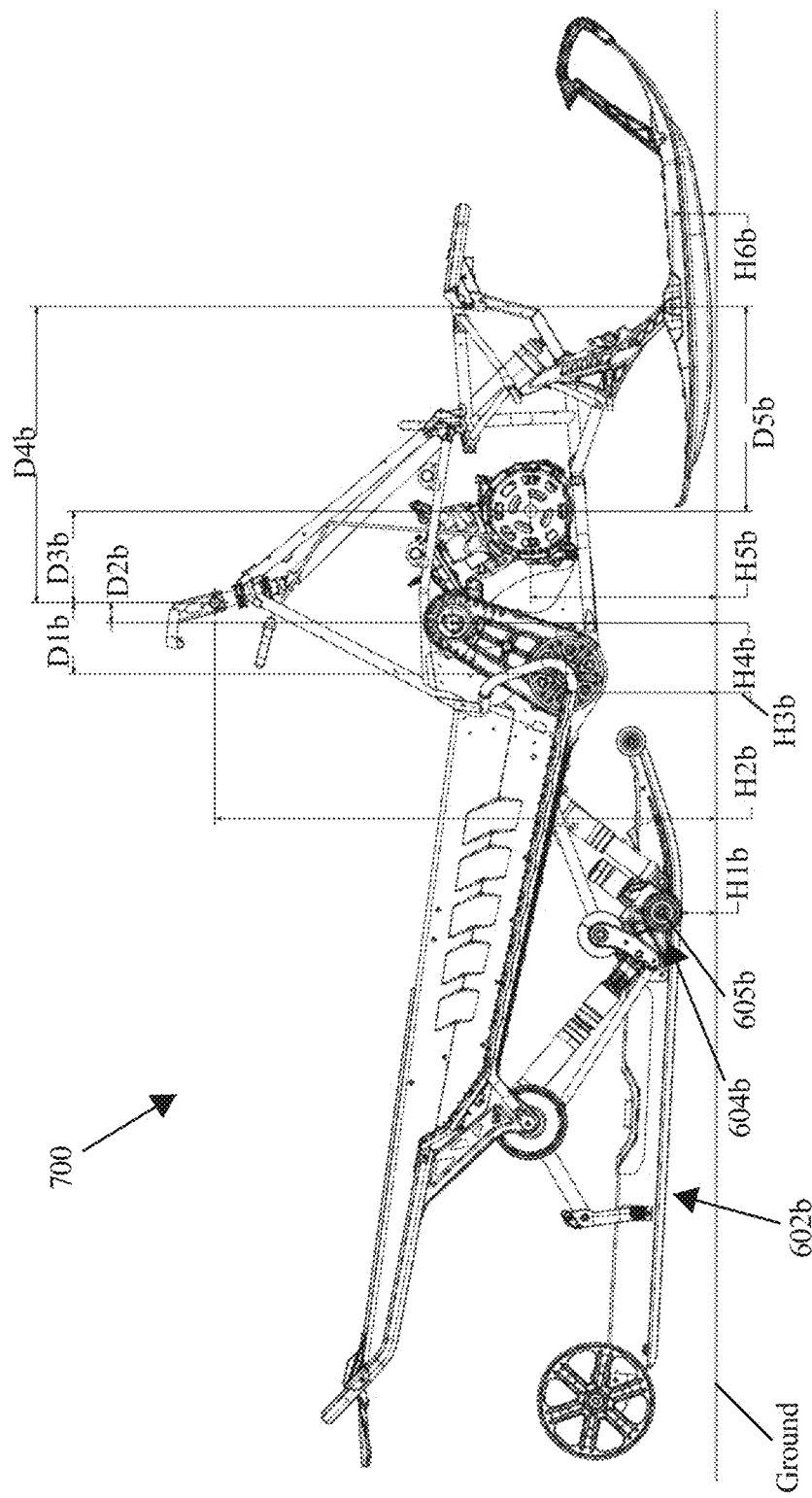
FIG. 17A is a side view of the snowmobile with the track removed, according to some embodiments.
Figure 17B:
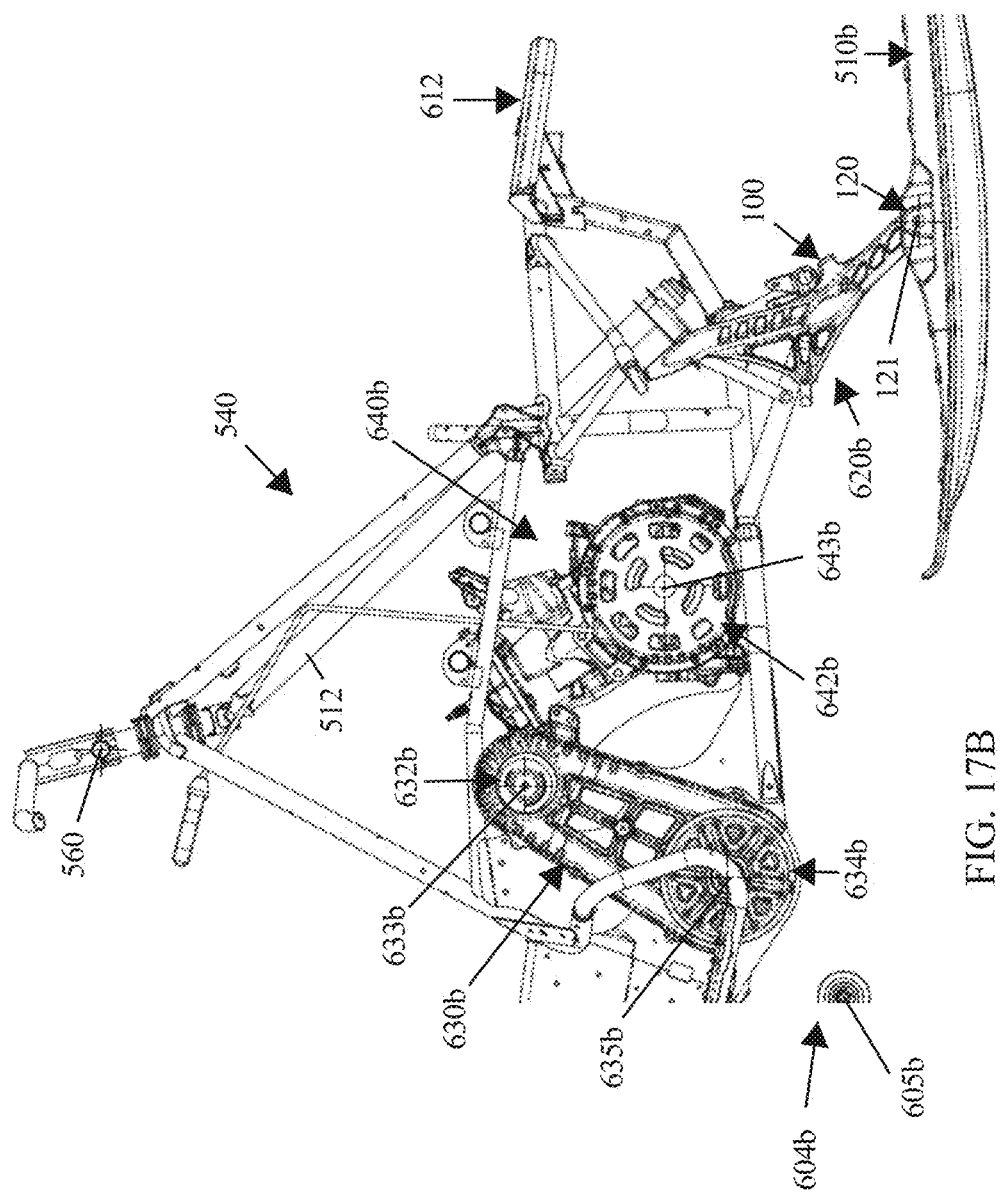
FIG. 17B is an enlarged view of a portion of the snowmobile, according to some embodiments.

FIG. 16A is a side view of a first embodiment of a snowmobile 600 with the suspension in a fully extended state and the skis directed forward, and FIG. 16B is an enlarged view of the front portion of the snowmobile 600 of FIG. 16A. FIG. 17A is a side view of a second embodiment of a snowmobile 700 with the suspension in a fully extended state and the skis directed forward, and FIG. 17B is an enlarged view of the front portion of the snowmobile 700 of FIG. 17A. The track of each snowmobile 600, 700 is removed for viewing purposes.

Each snowmobile 600, 700 includes a skid frame assembly 602, a common forward frame assembly 540, a front suspension 620, a belt housing assembly 630 operably connected to a track drive shaft, and an engine or motor assembly 640 operably connected to the belt housing assembly 630. The belt housing assembly 630 may comprise the belt housing assembly disclosed in co-pending U.S. patent application Ser. No. 17/588,487 filed on Jan. 31, 2022 and titled "Adjustable Belt Drive Assembly, System and Method," the contents of which are incorporated by reference in its entirety. The skid frame assembly 602 supports an endless track (not shown) that is driven by the track drive shaft, and the skid frame assembly 602 includes one or more idler wheels 604. As discussed above, the forward frame assembly 540 includes a steering column 512. The forward frame assembly 540 may further include a front bumper 612. The forward frame assembly 540 may be a common forward frame assembly utilized for different snowmobile embodiments, such as the two non-limiting examples illustrated in FIGS. 16A and 17A. As discussed above, the front suspension 620 is coupled to the forward frame 540 and includes a ski 510 and a spindle 100 with a ski mount 120. The belt housing assembly 630 includes a top drive sprocket 632 and a bottom drive sprocket 634 that is operably connected to the track drive shaft. The engine or motor assembly 640 may include a recoil housing 642 and a crankshaft axis of rotation 643. The position of a rider on the snowmobile 600 is approximated by a reference point 560 defining the uppermost fixed point on the steering column 512.

Distances D1, D2, D3, D4, D5, H1, H2, H3, H4, H5, and H6, represent distances measured when the shocks are at full maximum length (i.e., full suspension). D1, D2, D3, D4, and D5 are distances measured along the longitudinal axis 21 of the snowmobile 600, 700 to the reference point 560. H1, H2, H3, H4, H5, and H6 are distances measured by a line perpendicular to the ground.

The centerpoint 605 of idler wheel 604 is positioned rearward of the centerpoint 635 of the bottom drive sprocket 634. The centerpoint 635 is the location of the axis of rotation of the track drive shaft and may be referred to as such. The centerpoint 635 of the bottom drive sprocket 634 is positioned rearward of reference point 560 by a distance D1. The centerpoint 633 of the top drive sprocket 632 is positioned rearward of reference point 560 by a distance D2. The crankshaft axis of rotation 643 of the engine assembly 640 is positioned forward of reference point 560 by a distance D3. The centerpoint 121 of the ski mount 120 is positioned forward of reference point 560 by a distance D4. Distance D4 may be shorter than for a typical snowmobile (such as an adult or full-size vehicle). A smaller value for distance D4 positions the front suspension 620 and/or engine closer to the rider (a centralized mass) which may provide for a more responsive ride. The crankshaft axis of rotation 643 of the engine assembly 640 is positioned rearward of the centerpoint 121 of the ski mount 120 by a distance D5.

The centerpoint 635 of the bottom drive sprocket 634 is positioned rearward of the centerpoint 633 of the top drive sprocket 632 by a distance of D1−D2. The centerpoint 635 of the bottom drive sprocket 634 is positioned rearward the crankshaft axis of rotation 643 of the engine assembly 640 by a distance of D1+D3. The centerpoint 635 of the bottom drive sprocket 634 is positioned rearward of the centerpoint 121 of the ski mount 120 by a distance of D1+D4. The centerpoint 633 of the top drive sprocket 632 is positioned rearward of the crankshaft axis of rotation 643 of the engine assembly 640 by a distance of D2+D3. The centerpoint 633 of the top drive sprocket 632 is positioned rearward of the centerpoint 121 of the ski mount 120 by a distance of D2+D4. The crankshaft axis of rotation 643 of the engine assembly 640 is positioned rearward of the centerpoint 121 of the ski mount 120 by a distance of D4−D3.

The centerpoint 605 of a lower idler wheel 604 is positioned above the ground at a distance of H1. Reference point 560 is positioned above the ground at a distance of H2. The centerpoint 635 of a bottom drive sprocket 634 is positioned above the ground at a distance of H3. The centerpoint 633 of a top drive sprocket 632 is positioned above the ground at a distance of H4. The crankshaft axis of rotation 643 of the engine assembly 640 is positioned above the ground at a distance of H5. The centerpoint 121 of the ski mount 120 is positioned above the ground at a distance of H6.

In at least one embodiment, H1<H6<H3<H5<H4<H2. Thus, in at least one embodiment, the centerpoint 605 of idler wheel 604 is positioned closer to the ground than the centerpoint 121 of the ski mount 120; the centerpoint 121 of the ski mount 120 is positioned closer to the ground than the centerpoint 635 of the bottom drive sprocket 634; the centerpoint 635 of the bottom drive sprocket 634 is positioned closer to the ground than the crankshaft axis of rotation 643 of the engine assembly 640; the crankshaft axis of rotation 643 of the engine assembly 640 is positioned closer to the ground than the centerpoint 633 of the top drive sprocket 632; and the centerpoint 633 of the top drive sprocket 632 is positioned closer to the ground than reference point 560.

In one example, $H1a$ is 10-25% of $H5a$, optionally 15-20%; $H2a$ is 255-280% of $H5a$, optionally 260-270%; $H3a$ is 75-85% of $H5a$, optionally 78-82%, $H4a$ is 130-150% of $H5a$; optionally 135-145%; $H6a$ is 15-30% of $H5a$, optionally 20-25%; $D1a$ is 30-45% of $H5a$, optionally 35-40%; $D2a$ is 5-15% of $H5a$, optionally 8-13%; $D3a$ is 45-55% of $H5a$, optionally 47-52% of $H5a$; $D4a$ is 150-160% of $H5a$, optionally 154-160%; and $D5a$ is 100-115% of $H5a$, optionally 103-109%. (see e.g., FIG. 16A). In an illustrative example, H1 may be greater than H6.

In one example, $H1b$ is 10-25% of $H5b$, optionally 15-20%; $H2b$ is 265-275% of $H5b$; optionally 266-273%; $H3b$ is 75-85% of $H5b$, optionally 78-82%; $H4b$ is 135-145% of $H5b$, optionally 137-143%; $H6b$ is 15-30% of $H5b$, optionally 20-25%; $D1b$ is 30-45% of $H5b$, optionally 35-40%; $D2b$ is 5-15% of $H5b$, optionally 8-13%; $D3b$ is 40-55% of $H5b$, optionally 45-52%; $D4b$ is 155-170% of $H5b$, optionally 157-163%; $D5b$ is 100-115% of $H5b$, optionally 107-113% (see e.g., FIG. 17A).

In one example, H1 is 10-25% of H5, optionally 15-20%; H2 is 255-280% of H5; optionally 260-273%; H3 is 75-85% of H5, optionally 78-82%; H4 is 130-150% of H5, optionally 135-145%; H6 is 15-30% of H5, optionally 20-25%; D1 is 30-45% of H5, optionally 35-40%; D2 is 5-15% of H5, optionally 8-13%; D3 is 40-55% of H5, optionally 45-52%; D4 is 150-170% of H5, optionally 154-163%; D5 is 100-115% of H5, optionally 103-113%.

One benefit of the common forward frame assembly 540 is that front suspension 620, a belt housing assembly 630, and an engine or motor assembly 640 utilized for different snowmobile embodiments may have different orientations, different sizes, and/or different positions. As noted above, one or more of the distances D1-D5 and/or H1-H6 may differ between snowmobile embodiments. For example, the crankshaft axis of rotation $643a$ may be positioned farther from reference point 560 than the crankshaft axis of rotation $643b$—in other words $D3b<D3a$. This difference also results in a difference in the distance between the crankshaft axis of rotation 643 of the engine assembly 640 and the centerpoint of the top drive sprocket 632—i.e., $(D2b+D3b)<(D2a+D3a)$. As another example, the crankshaft axis of rotation $643a$ may be positioned higher above the ground than the crankshaft axis of rotation $643b$—in other words $H5b<H5a$.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A spindle for a snow vehicle, the spindle comprising:
    a base including a ski mount defining an axis of rotation;
    an upper control arm mount securable to an upper control arm of the snow vehicle;
    a lower control arm mount securable to a lower control arm of the snow vehicle;
    a spindle body extending between the base, the lower control arm mount, and the upper control arm mount; and
    a steering axis extending through the upper control arm mount, the lower control arm mount, and the ski mount,
    wherein the steering axis extends along a vertical plane, wherein a centerpoint of the ski mount is positioned outboard of the vertical plane.

2. The spindle of claim 1, wherein over 50% of the spindle body is positioned rearward of the steering axis.

3. The spindle of claim 1, wherein the steering axis is oriented at a steering axis angle between 25° and 35° relative to a ground plane.

4. The spindle of claim 3, wherein the spindle body includes a first portion extending between the base and the lower control arm mount, wherein an angle of the first portion relative to the ground plane is greater than the steering axis angle.

5. The spindle of claim 1, further comprising:
    a tie rod mount securable to a tie rod of the snow vehicle,
    wherein a second vertical plane extending through the tie rod mount is positioned outboard from the centerpoint of the ski mount.

6. The spindle of claim 5, wherein the spindle body includes a flat surface positioned outboard of the second vertical plane.

7. A spindle for a snow vehicle, the spindle comprising:
    a lower control arm mount securable to a lower control arm of the snow vehicle;
    an upper control arm mount securable to an upper control arm of the snow vehicle, the upper control arm mount positioned a first length from the lower control arm mount;
    a tie rod mount securable to a tie rod of the snow vehicle, the tie rod mount positioned a second length from the lower control arm mount;
    a base including a ski mount defining an axis of rotation, the base positioned a third length from the lower control arm mount; and
    a spindle body extending between the base, the lower control arm mount, the tie rod mount, and the upper control arm mount,
    wherein the tie rod mount is positioned outboard from the centerpoint of the ski mount.

8. The spindle of claim 7, wherein the first length is less than the second length.

9. The spindle of claim 8, wherein the third length is less than the first length.

10. The spindle of claim 9, wherein a fourth length between the tie rod mount and the upper control arm mount is less than the third length.

11. The spindle of claim 7, wherein the first length is between 50%-60% of a total spindle length between the tie rod mount and the ski mount.

12. The spindle of claim 7, wherein the second length is between 60%-70% of a total spindle length between the tie rod mount and the ski mount.

13. The spindle of claim 7, wherein the third length is between 30%-40% of a total spindle length between the tie rod mount and the ski mount.

14. A spindle for a snow vehicle, the spindle comprising:
    a lower control arm mount securable to a lower control arm of the snow vehicle;
    an upper control arm mount securable to an upper control arm of the snow vehicle, the upper control arm mount positioned a first height from the lower control arm mount;
    a tie rod mount securable to a tie rod of the snow vehicle, the tie rod mount positioned a third height from the lower control arm mount;
    a base including a ski mount defining an axis of rotation, the base positioned a second height from the lower control arm mount; and
    a spindle body extending between the base, the lower control arm mount, the tie rod mount, and the upper control arm mount,
    wherein the tie rod mount is positioned outboard from the centerpoint of the ski mount.

15. The spindle of claim 14, wherein the first height is greater than the second height and the second height is greater than the third height.

16. The spindle of claim 15, wherein a fourth height between the upper control arm mount and the tie rod mount is greater than the second height.

17. The spindle of claim 14, wherein the first height is between 55%-65% of a total spindle height between the upper control arm mount and the ski mount.

18. The spindle of claim 14, wherein the second height is between 35%-45% of a total spindle height between the upper control arm mount and the ski mount.

19. The spindle of claim 14, wherein the third height is between 5%-10% of a total spindle height between the upper control arm mount and the ski mount.

* * * * *